United States Patent
Gebhart

(10) Patent No.: US 10,252,628 B2
(45) Date of Patent: Apr. 9, 2019

(54) FLUID-COOLED ENERGY STORAGE DEVICE HAVING RESIN ENCAPSULATION

(71) Applicant: Voltu Motor, Inc., Miami, FL (US)

(72) Inventor: Jorge Guillermo Gebhart, Parana (AR)

(73) Assignee: VOLTU MOTOR, INC., Sunnyvale, CA (US)

( * ) Notice: Subject to any disclaimer, the term of this patent is extended or adjusted under 35 U.S.C. 154(b) by 0 days.

(21) Appl. No.: 15/726,152

(22) Filed: Oct. 5, 2017

(65) Prior Publication Data

US 2018/0147947 A1 May 31, 2018

Related U.S. Application Data

(60) Provisional application No. 62/404,706, filed on Oct. 5, 2016.

(51) Int. Cl.
| | | |
|---|---|---|
| *H02J 7/00* | (2006.01) | |
| *B60L 11/18* | (2006.01) | |
| *H01M 2/10* | (2006.01) | |
| *H01M 10/42* | (2006.01) | |
| *H01M 10/48* | (2006.01) | |
| *H02P 27/08* | (2006.01) | |
| *B60L 15/20* | (2006.01) | |

(52) U.S. Cl.
CPC .......... *B60L 11/1814* (2013.01); *B60L 11/18* (2013.01); *B60L 11/1803* (2013.01); *B60L 11/1816* (2013.01); *B60L 11/1862* (2013.01); *B60L 15/20* (2013.01); *H01M 2/1077* (2013.01); *H01M 10/4257* (2013.01); *H01M 10/48* (2013.01); *H02J 7/0021* (2013.01); *H02P 27/08* (2013.01); *B60L 2220/54* (2013.01); *B60L 2240/547* (2013.01); *H01M 2010/4271* (2013.01); *H01M 2220/20* (2013.01)

(58) Field of Classification Search
CPC ............................ B60L 11/1814; H02J 7/0021
USPC .......................................... 320/107, 150–154
See application file for complete search history.

(56) References Cited

U.S. PATENT DOCUMENTS

| | | |
|---|---|---|
| 4,309,644 A | 1/1982 | Reimers et al. |
| 4,491,768 A | 1/1985 | Slicker et al. |

(Continued)

OTHER PUBLICATIONS

International Search Report and Written Opinion for related PCT Application No. PCT/US2017/055427; dated Jan. 23, 2018, 14 pages.

*Primary Examiner* — Richard V Muralidar
(74) *Attorney, Agent, or Firm* — Procopio, Cory, Hargreaves & Savitch LLP

(57) ABSTRACT

An electric control system for an electric vehicle operable in a plurality of modes. The control system includes an electric motor having a plurality of motor coils, an energy storage device providing energy to the electric control system, transistor modules selectively coupling the electric motor to the energy storage device, a connector selectively coupling to an AC power source, a controllable switching device configured to selectively couple the connector to the electric motor; and a microcontroller controlling the switching device to couple the connector to at least one of the motor coils during a detected charging mode, and control one or more of the plurality of transistor modules to couple the motor coil to the energy storage device during the detected charging mode.

6 Claims, 26 Drawing Sheets

(56) References Cited

U.S. PATENT DOCUMENTS

| | | |
|---|---|---|
| 4,920,475 A | 4/1990 | Rippel et al. |
| 5,049,802 A | 9/1991 | Mintus et al. |
| 5,115,183 A | 5/1992 | Kyoukane et al. |
| 5,182,508 A | 1/1993 | Schauder et al. |
| 5,343,970 A | 9/1994 | Severinsky et al. |
| 5,448,154 A | 9/1995 | Kanke et al. |
| 5,581,171 A | 12/1996 | Kerfoot et al. |
| 5,639,571 A | 6/1997 | Waters et al. |
| 5,648,716 A | 7/1997 | Devilbiss et al. |
| 6,037,740 A | 3/2000 | Pollock et al. |
| 6,085,854 A | 7/2000 | Nishikawa et al. |
| 6,209,672 B1 | 4/2001 | Severinsky |
| 6,278,194 B1 | 8/2001 | Nakagawa et al. |
| 6,455,186 B1 | 9/2002 | Moores, Jr. et al. |
| 7,332,882 B2 | 2/2008 | Aoyagi et al. |
| 8,231,996 B2 | 7/2012 | Howard et al. |
| 8,297,389 B2 | 10/2012 | Takizawa |
| 8,647,763 B2 | 2/2014 | Tennessen et al. |
| 8,736,203 B2 | 5/2014 | Jang et al. |
| 8,981,730 B2 | 3/2015 | Yang et al. |
| 9,037,334 B1 | 5/2015 | Cole |
| 9,154,051 B2 | 10/2015 | Raichle et al. |
| 9,290,105 B2 | 3/2016 | Zhao et al. |
| 9,496,804 B2 | 11/2016 | Jang et al. |
| D793,955 S | 8/2017 | Yang |
| 2003/0013007 A1 | 1/2003 | Kaun |
| 2008/0292948 A1 | 11/2008 | Kumar et al. |
| 2009/0023056 A1 | 1/2009 | Adams et al. |
| 2010/0104938 A1 | 4/2010 | Hermann |
| 2011/0212356 A1 | 9/2011 | Tennessen et al. |
| 2011/0293986 A1* | 12/2011 | Kozu ............... H01M 2/105 429/120 |
| 2012/0094162 A1 | 4/2012 | Gyenes |
| 2013/0004820 A1 | 1/2013 | Tennessen et al. |

\* cited by examiner

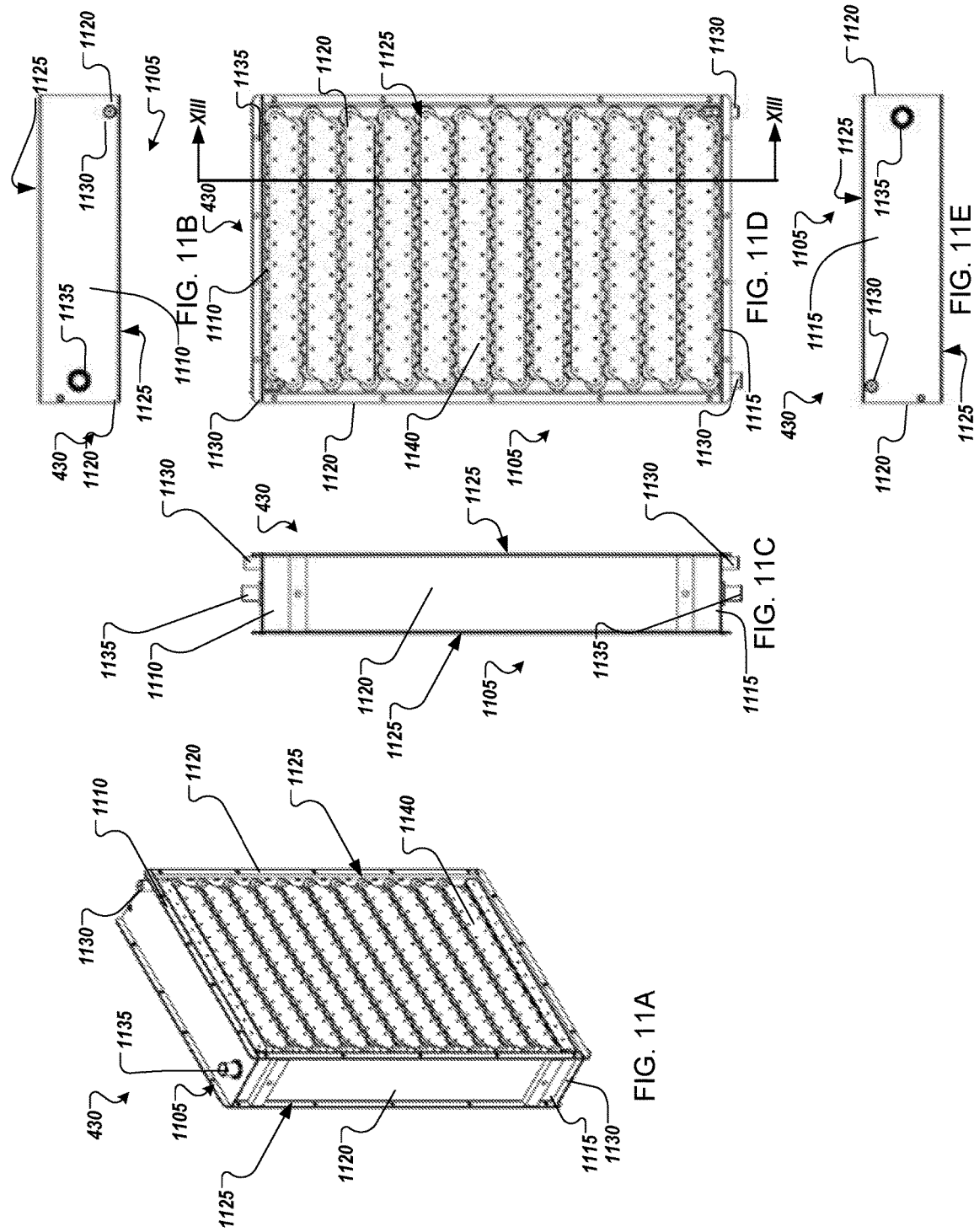

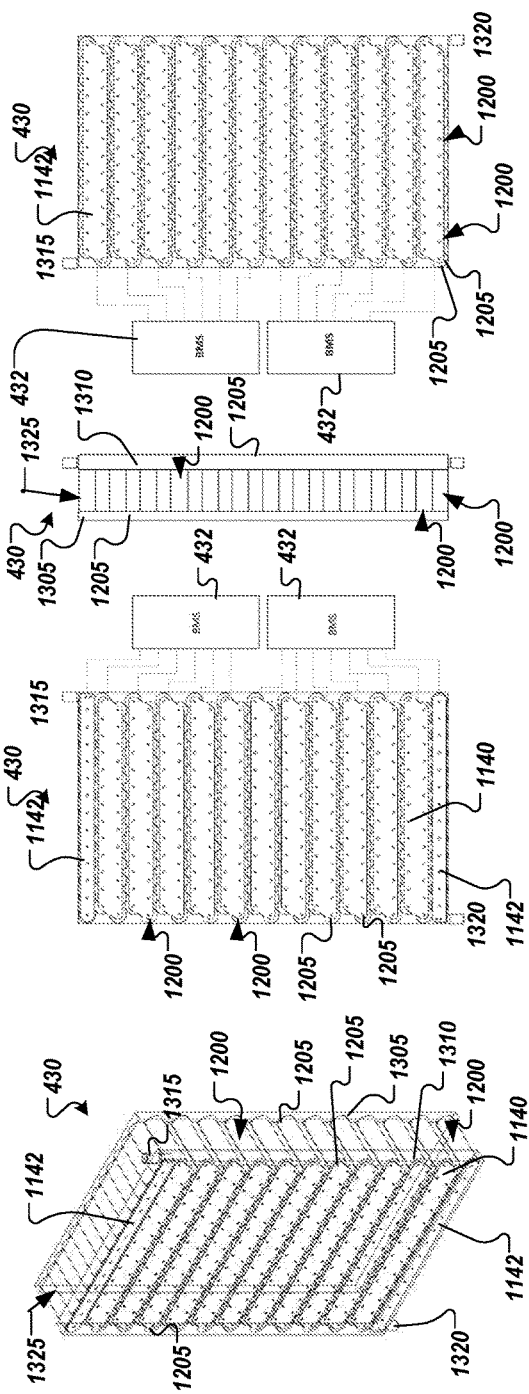
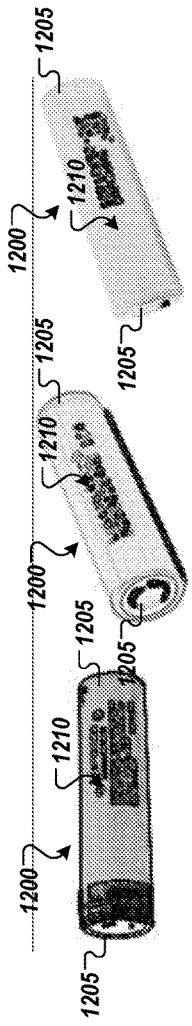
FIG. 13A  FIG. 13B  FIG. 13C  FIG. 13D
FIG. 12

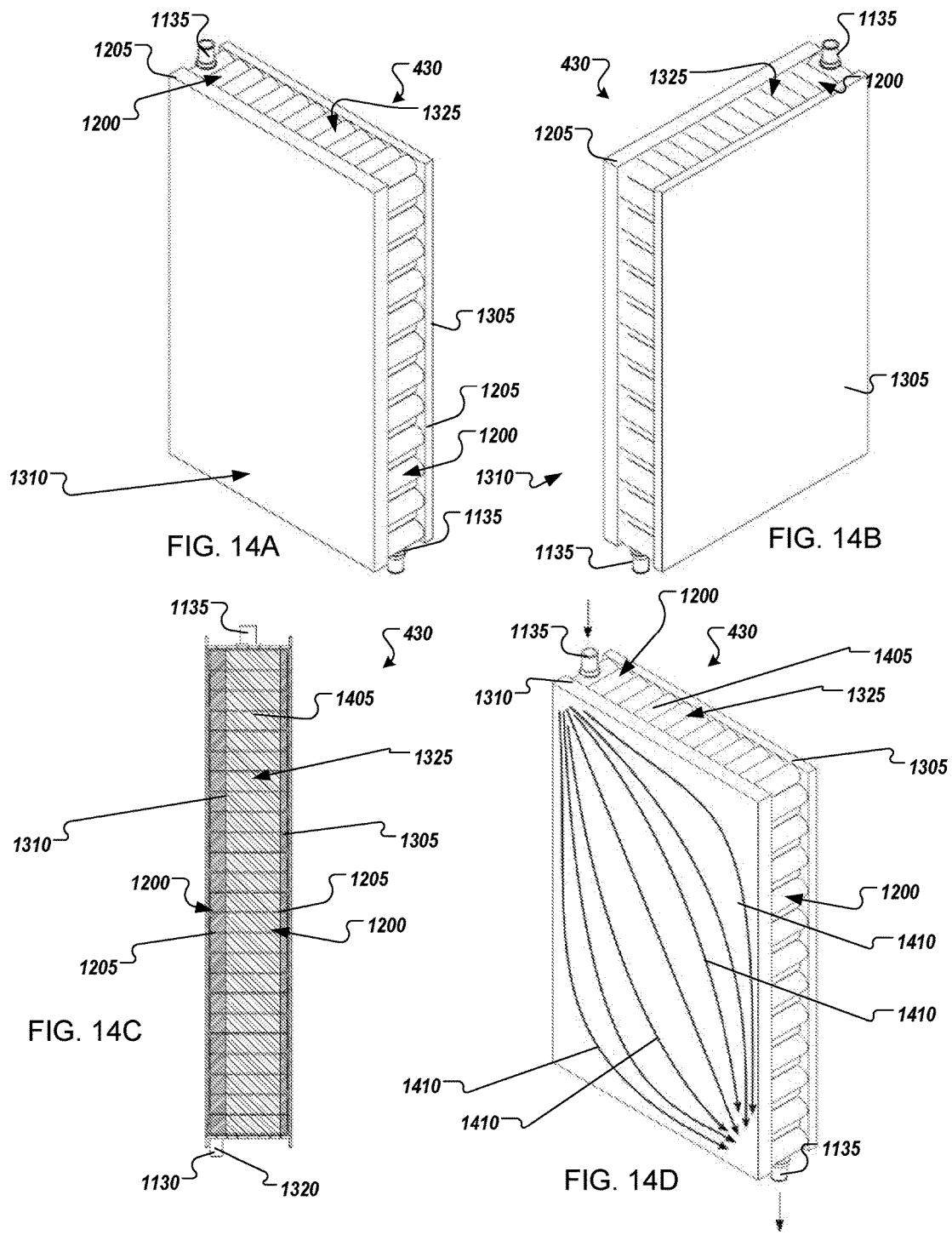

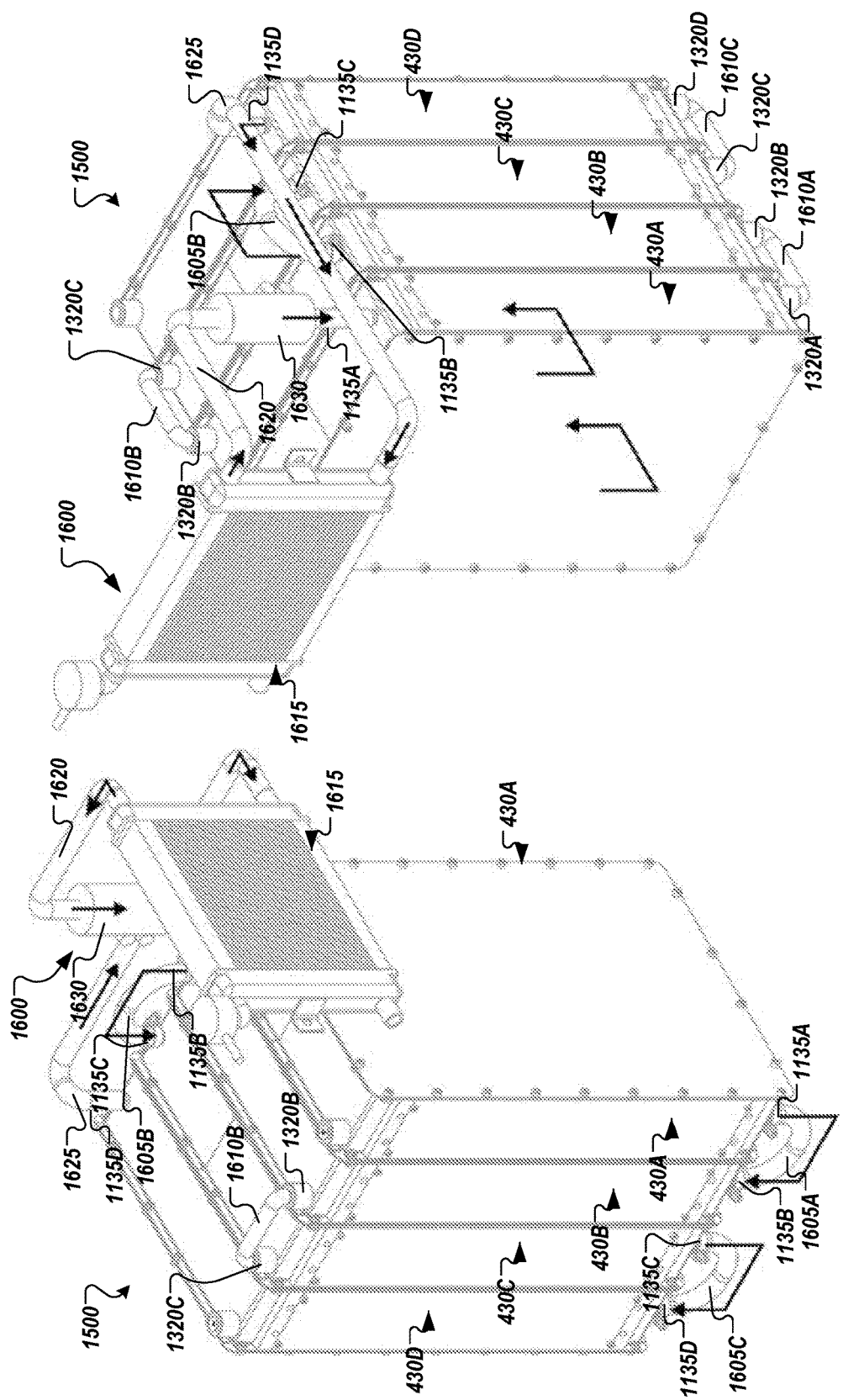

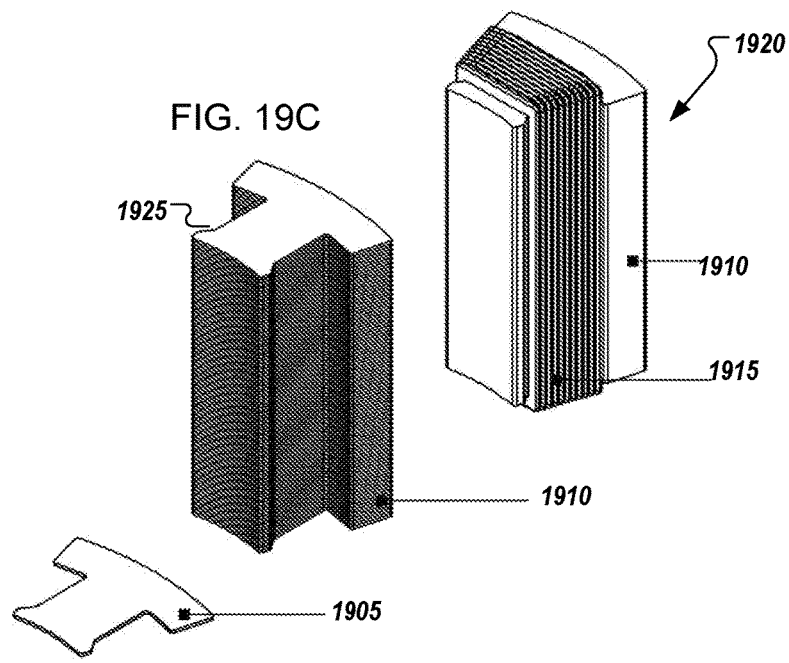
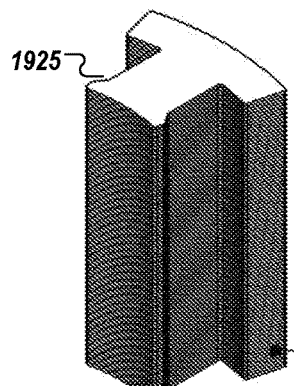
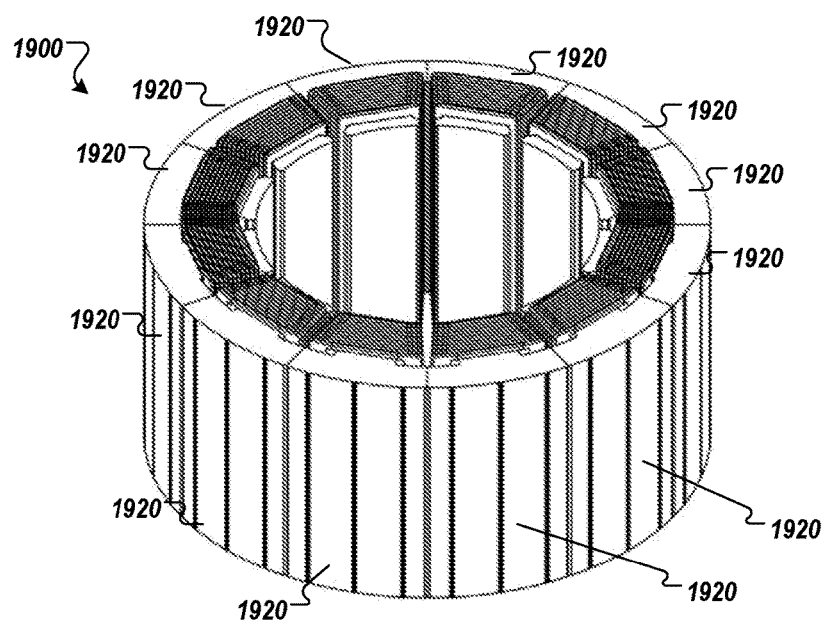
FIG. 19B
FIG. 19C
FIG. 19D
FIG. 19A

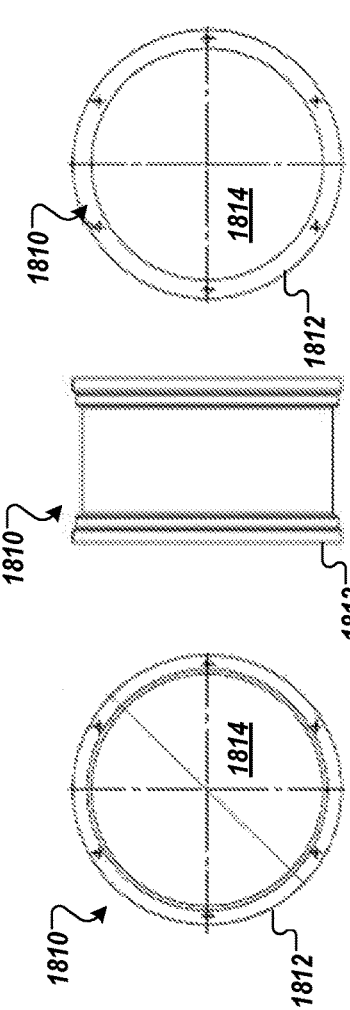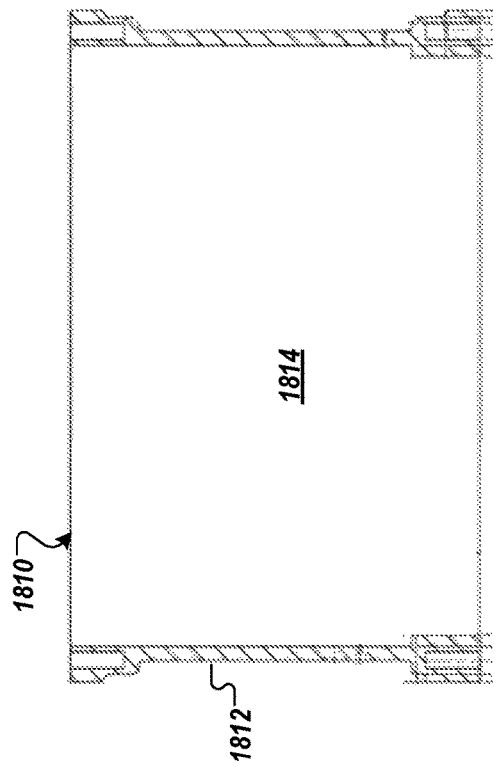

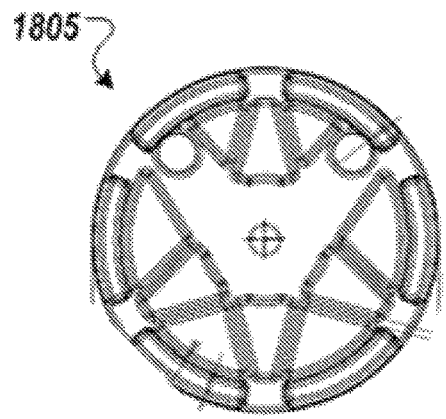
FIG. 21B
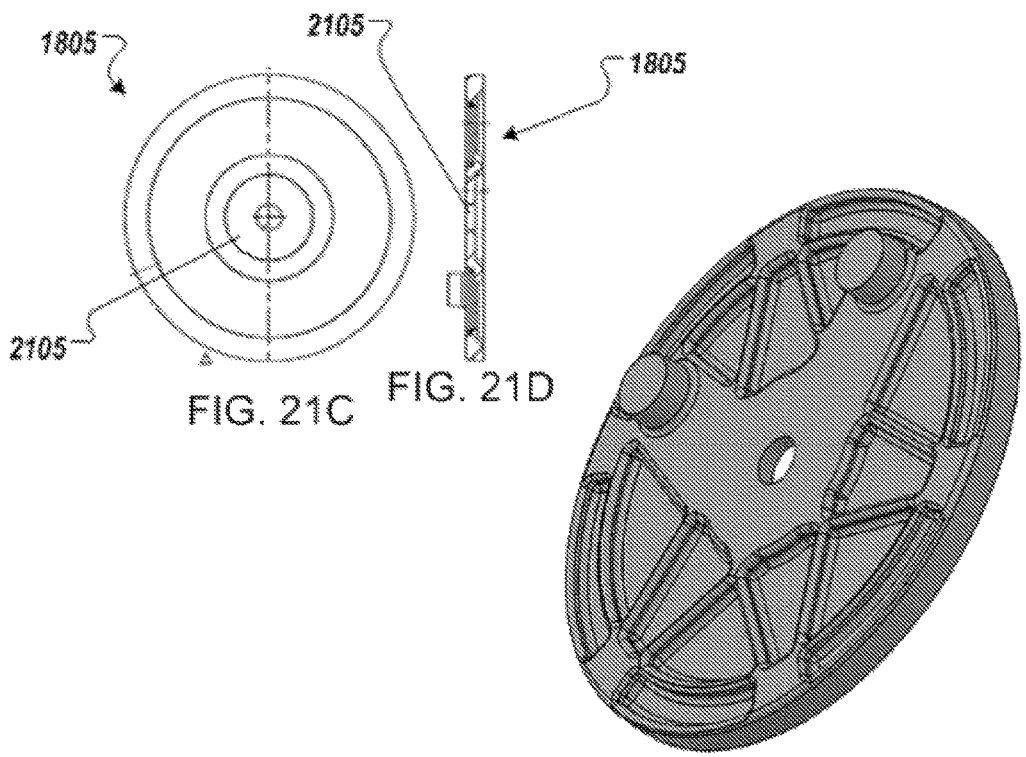
FIG. 21C  FIG. 21D
FIG. 21A

FLUID-COOLED ENERGY STORAGE DEVICE HAVING RESIN ENCAPSULATION

CROSS-REFERENCE TO RELATED APPLICATIONS

This application claims benefit of priority from Provisional U.S. Patent application Ser. No. 62/404,706, filed Oct. 5, 2016, the contents of which are incorporated by reference.

TECHNICAL FIELD

Aspects of the example implementations relate to a vehicle powered by electricity, and more specifically, to a motor, motor controller and battery pack charger, and related methods and apparatuses used in associated with an electric motorcycle.

RELATED ART

Electric vehicles (EVs) (e.g., electric cars, electric trucks, electric bicycles, electric motorcycles, or any other electric vehicle that might be apparent to a person of ordinary skill in the art) are becoming more ubiquitous as technology improves and a support infrastructure (e.g., charging stations, home chargers) is constructed. FIGS. 1-3 illustrate circuit schematics of electrical systems of a related art EV. As illustrated, in related art EVs separate systems are provided for the electrical drive system and the electrical charging system. Specifically, FIG. 1 illustrates the electrical drive system 100 of the related art EV and FIG. 2 illustrates the electrical charging system 200 of the related art EV. The electrical drive system 100 units may be communicatively coupled with the electrical charging system 200.

As illustrated in FIG. 1, the electrical drive system 100 includes a 3-phase electric motor 105 including 3 motor coils 107a-107c, a battery pack 130, and a microcontroller 125 controlling electrical flow between the battery pack 130 and the motor 105. The drive system 100 also includes three current sensors 110a-110c monitoring current through each phase (motor coils 107a-107c) of the motor 105 and provides the readings to the microcontroller 125. Additionally, a plurality of transistor modules 115a-115c are also provided in the drive system 100. Each of the transistor modules 115a-115c is connected to a phase (motor coils 107a-107c) of the motor 105 and controls current flow between the battery 130 and the three phases (motor coils 107a-107c) of the motor based on signals from the microcontroller 125. The drive system may also include a capacitor 120 electrically coupled to the terminals of the battery pack 130, and voltage and current sensors (135,140) from the battery pack 130. The application, a motor, motor controller, and a battery pack charger are provided as different units. These units may be communicatively coupled with one another. The following drawing illustrates such a related art EV system.

As illustrated in FIG. 2, the electrical charging system 200 includes a connector 205 configured to connect to an AC source to receive AC voltage, the battery pack 130 and a charger microcontroller 225 controlling electrical flow between the battery pack 130 and the connector 205 receiving the AC voltage. The electrical charging system 200 also includes voltage and current sensors 201, 203 measuring voltage and current from the AC source and providing readings to the charger microcontroller 225. The charger microcontroller 225 may control a relay 209 selectively coupling the connector 205 to the charging circuit 214 of the system 200 via bridge circuit 211 and capacitor as illustrated.

The charging system 200 also includes three current sensors 210a-210c monitoring current through each phase (inductor 207a-207c) of the charging circuit 214 and provides the readings to the charging microcontroller 225. Additionally, a plurality of transistor modules 215a-215c are also provided in the charging circuit 214. Each of the transistor modules 215a-215c is connected to a phase (inductor 207a-207c) of the charging circuit 214 and controls current flow between the battery 130 and the three phases (inductor 207a-207c) of the charging circuit 214 based on signals from the charging microcontroller 225. The charging system 200 may also include a capacitor 220 electrically coupled to the terminals of the battery pack 130, and voltage and current sensors (235,240) from the battery pack 130.

However, as illustrated in FIG. 3 having the separate electrical drive system 100 and electrical charging system 200 results in redundant components between the two systems 100,200. For example, both the electrical drive system 100 and electrical charging system 200 include a set of three inductors corresponding three phases of AC voltage (e.g., motor coils 107a-107c of the motor 105 and inductors 207a-207c of the charging circuit 214). Similarly, both the electrical drive system 100 and electrical charging system 200 include a set of three current sensors corresponding three phases of AC voltage (e.g., current sensors 110a-110c and current sensors 210a-210c). Further, both the electrical drive system 100 and electrical charging system 200 include sets of three transistor modules corresponding three phases of AC voltage (e.g., transistor modules 115a-115c and transistor modules 215a-215c). These redundant components can result in added weight, which can reduce travel range of an EV.

SUMMARY OF THE DISCLOSURE

Aspects of the present disclosure may include an electric control system for an electric vehicle. The electric control system may be configured to operate in a plurality of modes. The electric control system may include a multi-phase electric motor having a plurality of motor coils, an energy storage device configured to provide energy to the electric control system, a plurality of transistor modules selectively coupling the electric motor to the energy storage device, a connector configured to selectively couple to an AC power source, a controllable switching device configured to selectively couple the connector to the multi-phase electric motor, and a microcontroller configured to control the switching device to selectively couple the connector to at least one of the motor coils during a detected charging mode, and control one or more of the plurality of transistor modules to selectively couple the at least one motor coil to the energy storage device during the detected charging mode.

Further aspects of the present disclosure may include an electric vehicle. The electric vehicle may include a drive train having at least one wheel, a multi-phase electric motor having a plurality of motor coils coupled to the drive train to provide a torque to the at least one wheel, an electrical control system configured to operate in a plurality of modes. The control system may include an energy storage device configured to provide energy to the electric control system, a plurality of transistor modules selectively coupling the electric motor to the energy storage device, a connector configured to selectively couple to an AC power source, a controllable switching device configured to selectively couple the connector to the multi-phase electric motor and a microcontroller configured to control the switching device to selectively couple the connector to at least one of the motor coils during a detected charging mode, and control one or more of the plurality of transistor modules to selectively couple the at least one motor coil to the energy storage device during the detected charging mode.

Additionally aspects of the present disclosure may include an energy storage device for an electric vehicle. The energy storage device may include a housing defining an interior volume, a plurality power cells, arranged in the interior volume of the housing, each power cell having a first terminal at one end and a second terminal at another end, wherein each of the plurality of power cells extending in a substantially parallel configuration with intervening spaces being provided between adjacent power cells, a resin sheet encapsulating at least one end of each of the plurality of power cells and holding the plurality of power cells in a rigid configuration, and a heat absorbing fluid within the housing, circulating through the intervening spaces contacting an exterior of at least one of the plurality of power cells.

BRIEF DESCRIPTION OF DRAWINGS

FIGS. 11A-11E illustrate exterior views of example implementations of a battery pack in accordance with the present application.

FIG. 12 illustrates a several example implementations of individual cells for a battery pack in accordance with the present application.

FIGS. 13A-13E illustrate a configuration of packing cells within battery pack in accordance with example implementations of the present application.

FIGS. 14A-14D illustrate configuration for cooling the individual cells of a battery pack in accordance with an example implementation of the present application.

FIGS. 16A and 16B illustrate perspective views of the energy module of FIG. 15 with an integrated cooling system in accordance with an example implementation of the present application.

FIG. 19A illustrates a perspective view of segmented stator in accordance with an example implementation of the present application.

FIG. 19B illustrates a perspective view of a stator tooth unit in accordance with an example implementation of the present application.

FIG. 19C illustrates a stator tooth body in accordance with an example implementation of the present application.

FIG. 19D illustrates a stator sheet that may be used to form a stator tooth body in accordance with the present application.

FIG. 20A illustrates a top view of a motor body in accordance with an example implementation of the present application.

FIG. 20B illustrates a side view of a motor body in accordance with an example implementation of the present application.

FIG. 20C illustrates a bottom view of a motor body in accordance with an example implementation of the present application.

FIG. 20D illustrates a cross-section view of a motor body in accordance with an example implementation of the present application.

FIG. 21A is a perspective view of an end shield in accordance with an example implementation of the present application.

FIG. 21B is a front view of an end shield in accordance with an example implementation of the present application.

FIG. 21C is a back view of an end shield in accordance with an example implementation of the present application.

FIG. 21D is a cross-section view of an end shield in accordance with an example implementation of the present application.

DETAILED DESCRIPTION

Figure 1:
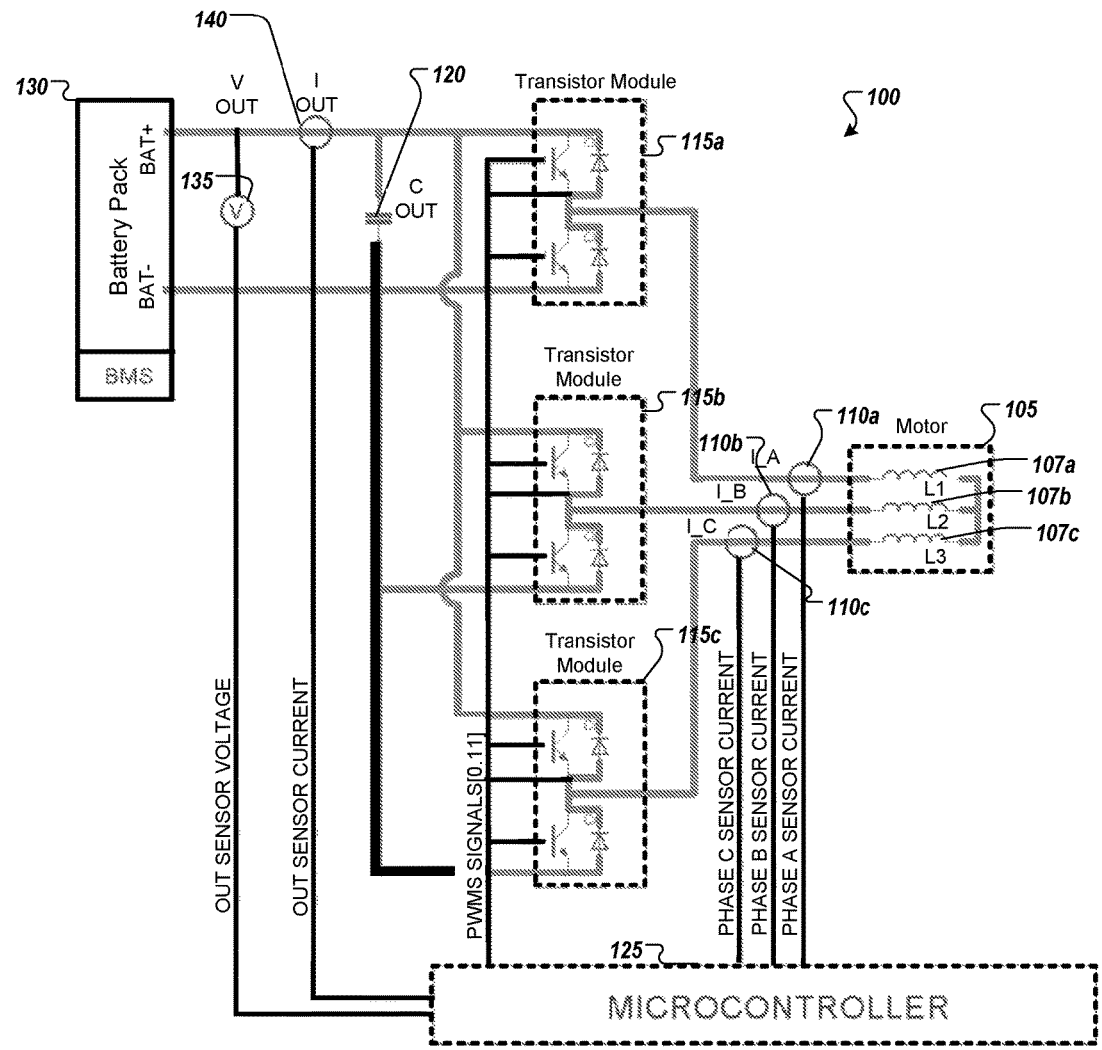
FIGS. 1-3 illustrate circuit schematics of electrical systems of a related art EV.
Figure 2:
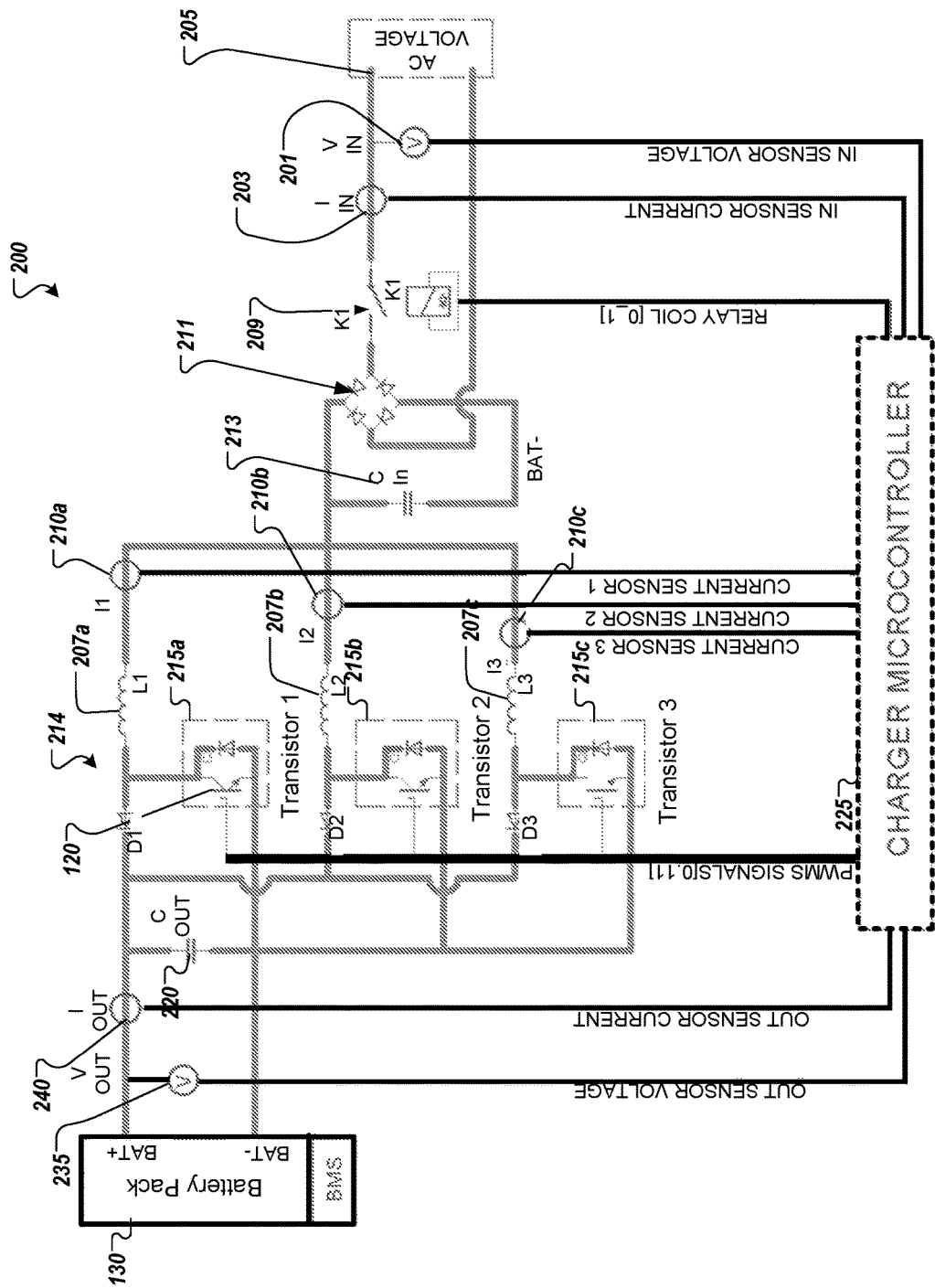
Figure 3:
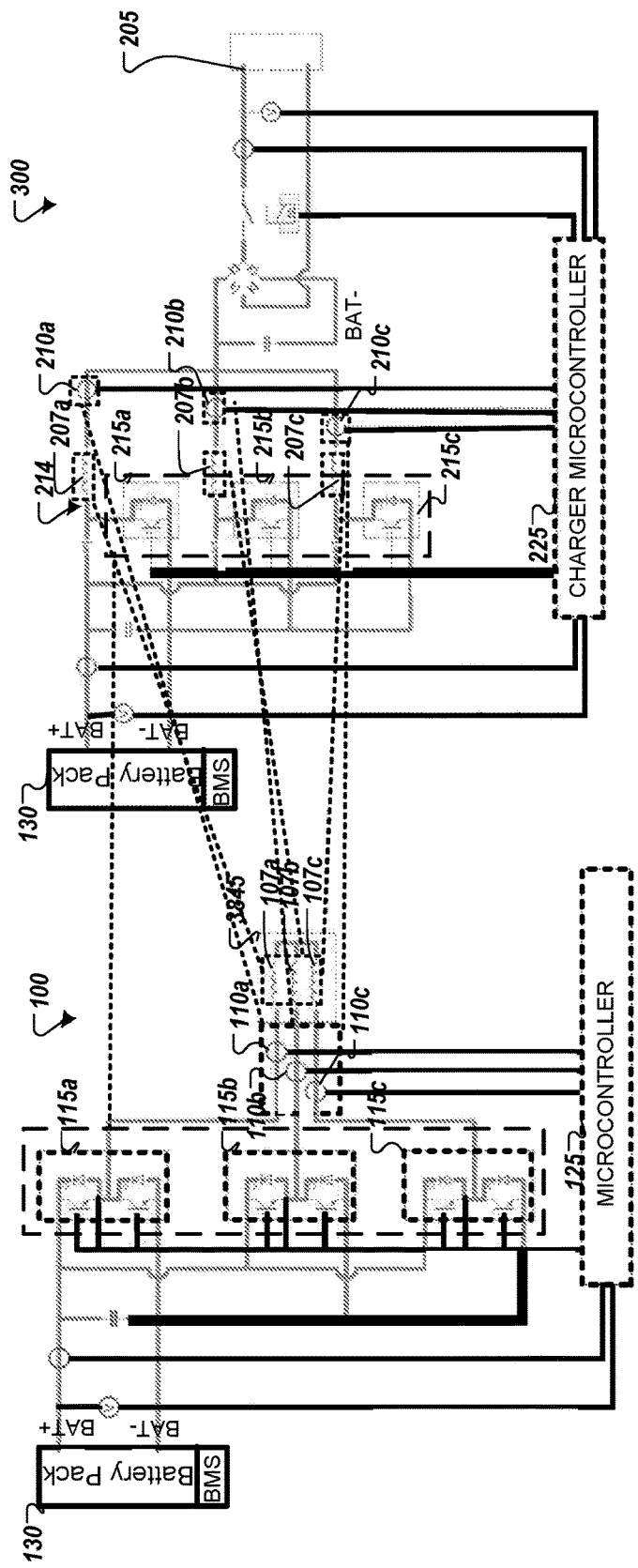

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

As discussed above, related art Electric vehicles (EVs) use separate systems for charging an onboard battery and a driving an electric motor from the battery. However, using completely separate systems may result in the two systems each having duplicative elements (e.g., inductors, sensors, and transistor modules) that increase the weight and complexity of the electrical systems. Example implementations of the present application may combine an engine driving system, a battery charging system and, optionally, an AC generator to achieve multiple modes of operation with the same hardware and allow the motor to be used not only for motoring, but also for charging and generating AC (alternating current), reusing the motor coils as buck or boost converter inductors. This allows a reduction in cost, weight, complexity of the system, and charging to the same peak current as motoring.

Figure 4:
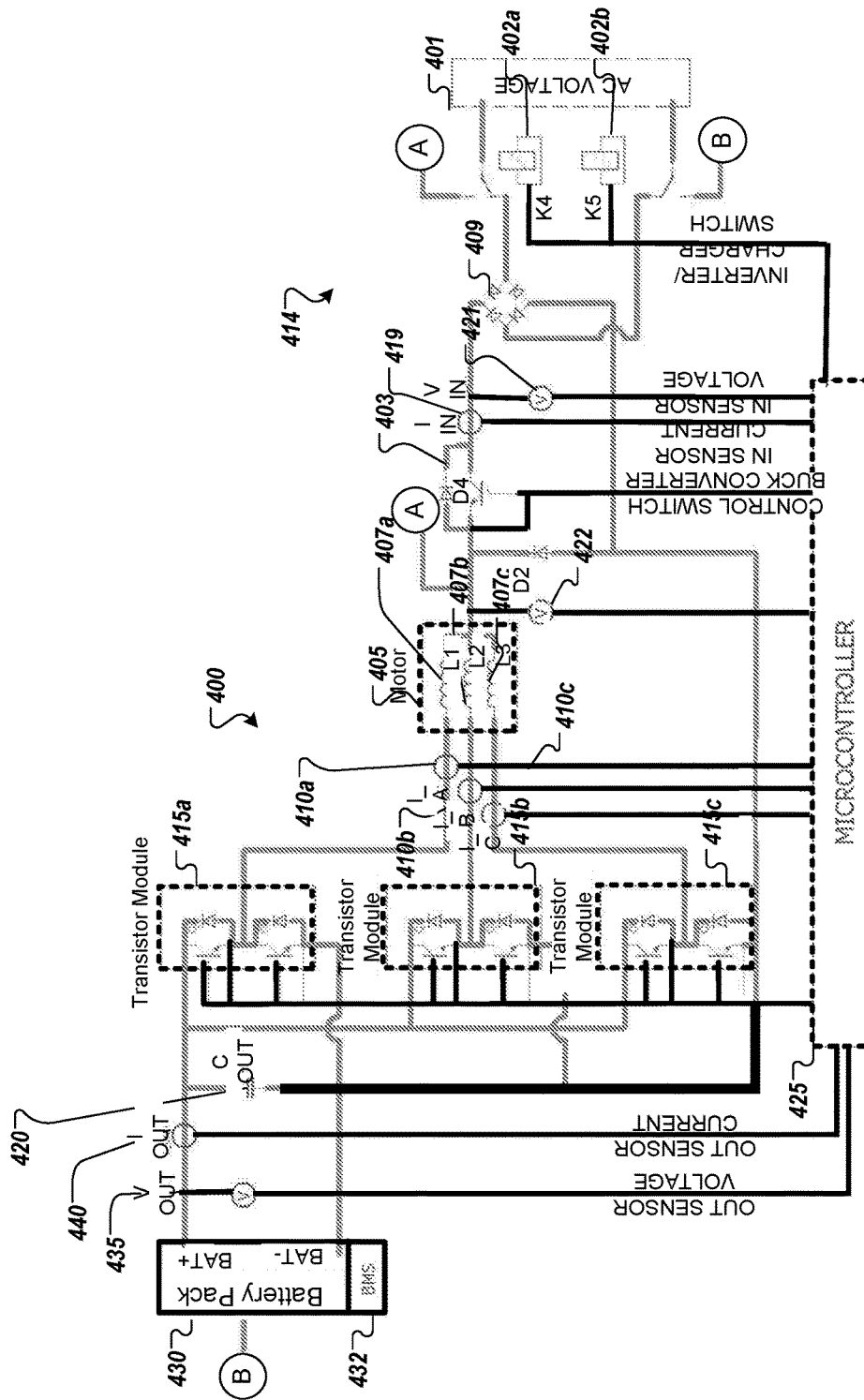
FIGS. 4-10 illustrate circuit schematics of a full EV drive train system in accordance with example implementations of the present application.

FIG. 4 illustrates an electrical schematic of a full EV drive train system 400 in accordance with example implementations of the present application. Example implementations of the full EV drive train system 400 may be used to provide the multiple modes of operation by an electrical vehicle such as an electric car, electric bicycle, and an electric motorcycle. For example, the systems described herein could be used on an electric high performance motorcycle with 90 horsepower [HP] of power with a range of 300 kilometer [Km]. The electric vehicle drive train may include synchronous motor technology that enables high performance, energy efficiency and reduced volume, compared with state of the art proprietary electronic technology and algorithms, and uses battery energy.

As illustrated, the full EV drive train system 400 includes a 3-phase electric motor 405 including 3 motor coils 407a-407c, a battery pack 430, and a microcontroller 425 controlling electrical flow between the battery pack 430 and the motor 405. The full EV drive train system 400 also includes three current sensors 410a-410c monitoring current through each phase (motor coil 407a-407c) of the motor 405 and provides the readings to the microcontroller 425. Additionally, a plurality of transistor modules 415a-415c are also provided in the full EV drive train system 400. Each of the transistor modules 415a-415c is connected to a phase (motor coils 407a-407c) of the motor 405 and controls current flow between the battery 430 and the three phases (motor coils 407a-407c) of the motor based on signals from the microcontroller 425. The drive system may also include a capacitor 420 electrically coupled to the terminals of the battery pack 430, and voltage and current sensors (435,440) from the battery pack 430.

Additionally, the full EV drive train system 400 power input circuit 414 may include a connector 401 configured to be connected to an AC voltage. The connector 401 may be connected to a pair of relay switches 402a, 402b controlled by the microcontroller 425 to selectively switch between inverter (driving) and charging modes, and optionally an AC generator mode. In one position, the relay switches 402a, 402b connect to the coils 407a, 407b, 407c of the motor 405 through a bridge circuit 409 and buck switch 403. In a second position, one of the relay switches 402a may connect the connector 401 to the coils 407a, 407b, 407c of the motor 405, bypassing bridge circuit 409 and buck switch 403 as illustrated by (A). The other relay switch 402b connects the connector 401 to a middle terminal of the battery pack 430 as illustrated by (B) in its second position.

With the pair of relay switches in position 1 (connected to the rectifier bridge 409) the circuit can work as an inverter (driving) and as a battery charger. When switches are on position 2, the circuit can generate alternating current for injecting it to the grid.

The full EV drive train system 400 also includes current and voltage sensors 419, 421 that measure current and voltage at the buck switch 403 and provide readings to microcontroller 425. Additionally, control system may also include a voltage sensor 422 that measures voltage at the coils 407a-407c and provides readings to the microcontroller 425.

Example implementations of this configuration may allow use of the same hardware for driving the motor and charging the battery by reusing the motor coils as charging inductors through selectively controlling switching within the full EV drive train system 400. This may allow a reduction in cost, weight, complexity of the system, and charging to the same peak current as motoring.

Example implementations of this system may be designed to efficiently use all the power available on the batteries in the entire velocity/torque curve. Typically, other systems adapt to the motor max power capability.

Example implementations of this system may implement a main Vehicle Control Unit on the same hardware.

Additionally as discussed below, example implementations of this system are capable of supplying energy to a community power grid through the generation of an alternating current using the battery bank 430 and the same EV drive train system 400 hardware. This additional functionality may allow the provision of a stable source of AC to a house or any other application, which could require it.

This selective functionality may be achieved in some applications by combining motor controller, the charger and the inverter in a single hardware configuration, allowing the electric motor to be used not only for motoring, but for charging and inverting by reusing the motor coils as buck and boost converter inductors. In some example implementations, the full EV drive train system 400 may use the motor 405 as a three phase synchronous motor controller or as a BLDC motor with field vector control, flux weakening control, regenerative braking, charger and Vehicle Control Unit (vehicle general management).

As discussed below, when the motor 405 is not in operation, the full EV drive train system 400 may work as a charger by using the motor coils 407a-407c and the same transistor modules 415a-415c for elevating the input voltage to charge the batteries. That, combined with information from a Battery Management System (BMS) 432 integrated into the battery pack 430 and the Buck Switch 403 to charge the battery when its voltage is lower than the input and PFC microcontroller 425 implemented on the same system, results in a full EV drive train system 400 for motoring and charging the battery.

Another optional functionality of example implementations of this full EV drive train system 400 may include a capability of behaving as an AC voltage/current source when the motor is not in operation. This functionality may be achieved by controlling the pair of relay switches 402*a*, 402*b* that are connected to the AC input connector 401. This configuration may allow delivery of a sinusoidal wave obtained by switching the shared transistor modules 415*a*-415*c* between a configuration that may be used to drive the motor 405 and a configuration that may be used to charge the battery pack 430.

In some example implementations, the full EV drive train system may establish a Controller Area Network (CAN) communication protocol to communicate with the other parts of the system and incorporates a USB communication channel to send and receive information from the infotainment system.

FIGS. 5-10 illustrate simplified circuit configurations representing different modes of the full EV drive train system 400 illustrated in FIG. 4. The circuit configurations illustrated in FIGS. 5-10 represent functional circuits achieved by selectively changing relay and switch positions of the full EV drive train system 400 illustrated in FIG. 4.

Motor Driving Mode

Figure 5:
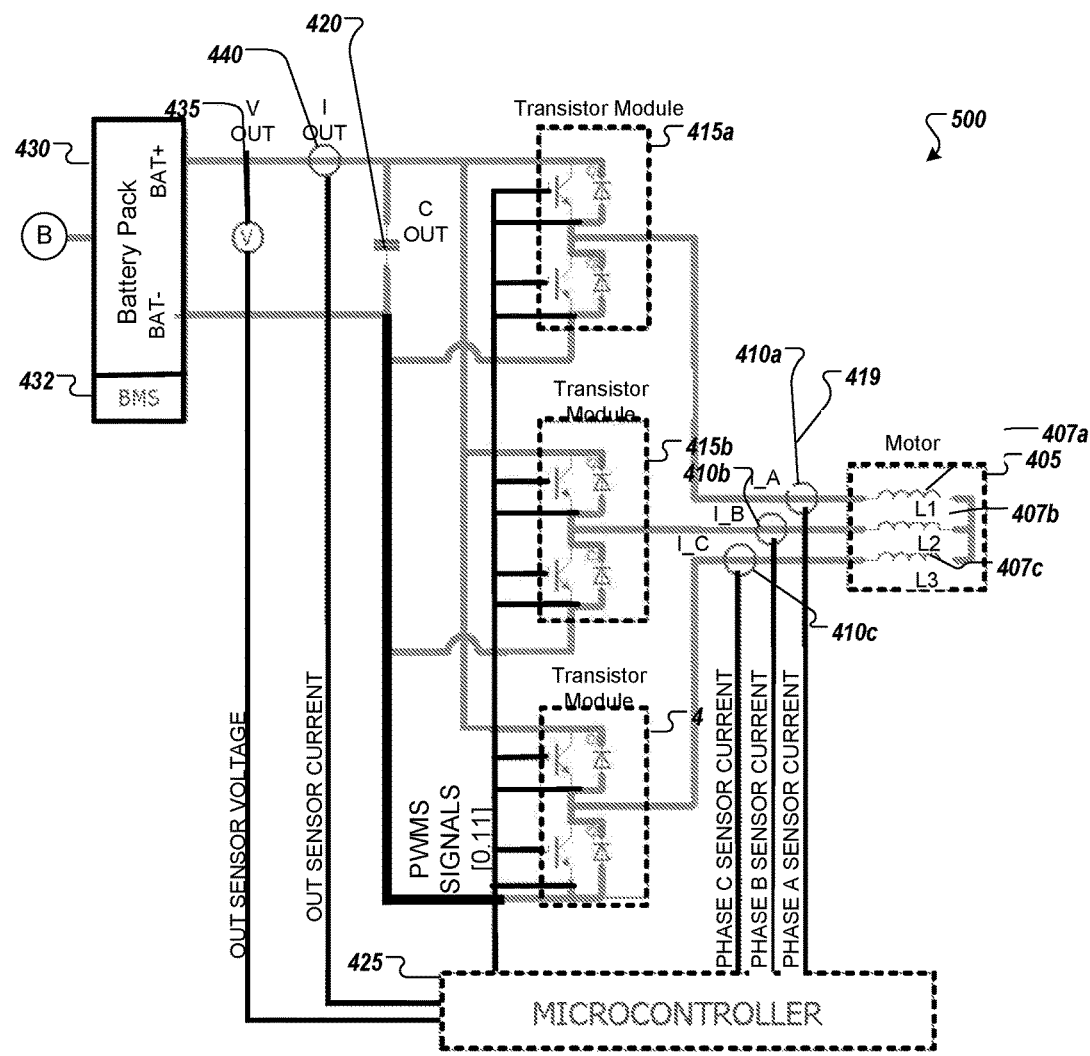

FIG. 5 illustrates the functional circuit 500 used to drive the motor 405 based on energy from the battery pack 430. In this configuration, the functional circuit 500 has been isolated form the power input circuit 414 illustrated in FIG. 4. As illustrated, when driving, the current flows from battery pack 430 to the motor 405, with the three transistor modules 415*a*-415*c* functioning as three half bridges to modulate the DC battery current into a three phase balanced sinusoidal current if the motor 405 is a Permanent Magnet Synchronous Motor (PMSM) or into Trapezoidal current if the motor 405 is a brushless DC electric Motor (BLDC motor). Additionally, the functional circuit may use switches in each transistor module 415*a*-415*c* to elevate the voltage and control the current that flows to the battery. The three transistor modules 415*a*-415*c* may also be used to implement flux vector control, flux weakening, regenerative braking, current control and speed control.

For example, when the electric vehicle is decelerating, a regenerative braking mode may be used to use the kinetic energy of the vehicle to turn the motor 405 as a generator and the three transistor modules 415*a*-415*c* may operate to transfer current generated by the motor 405 to partially charge the battery pack 430.

Charging Mode

Figure 6:
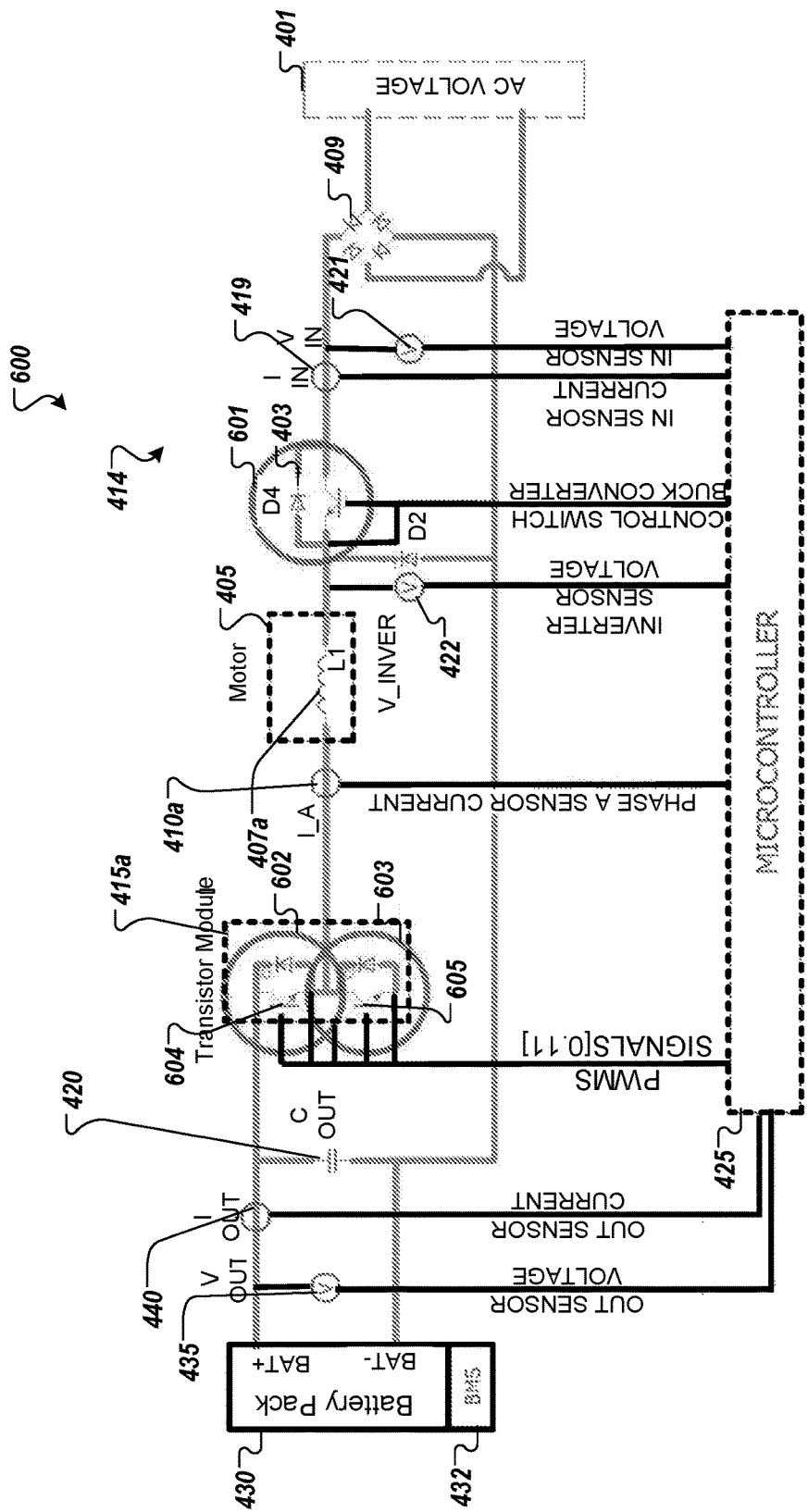
Figure 7:
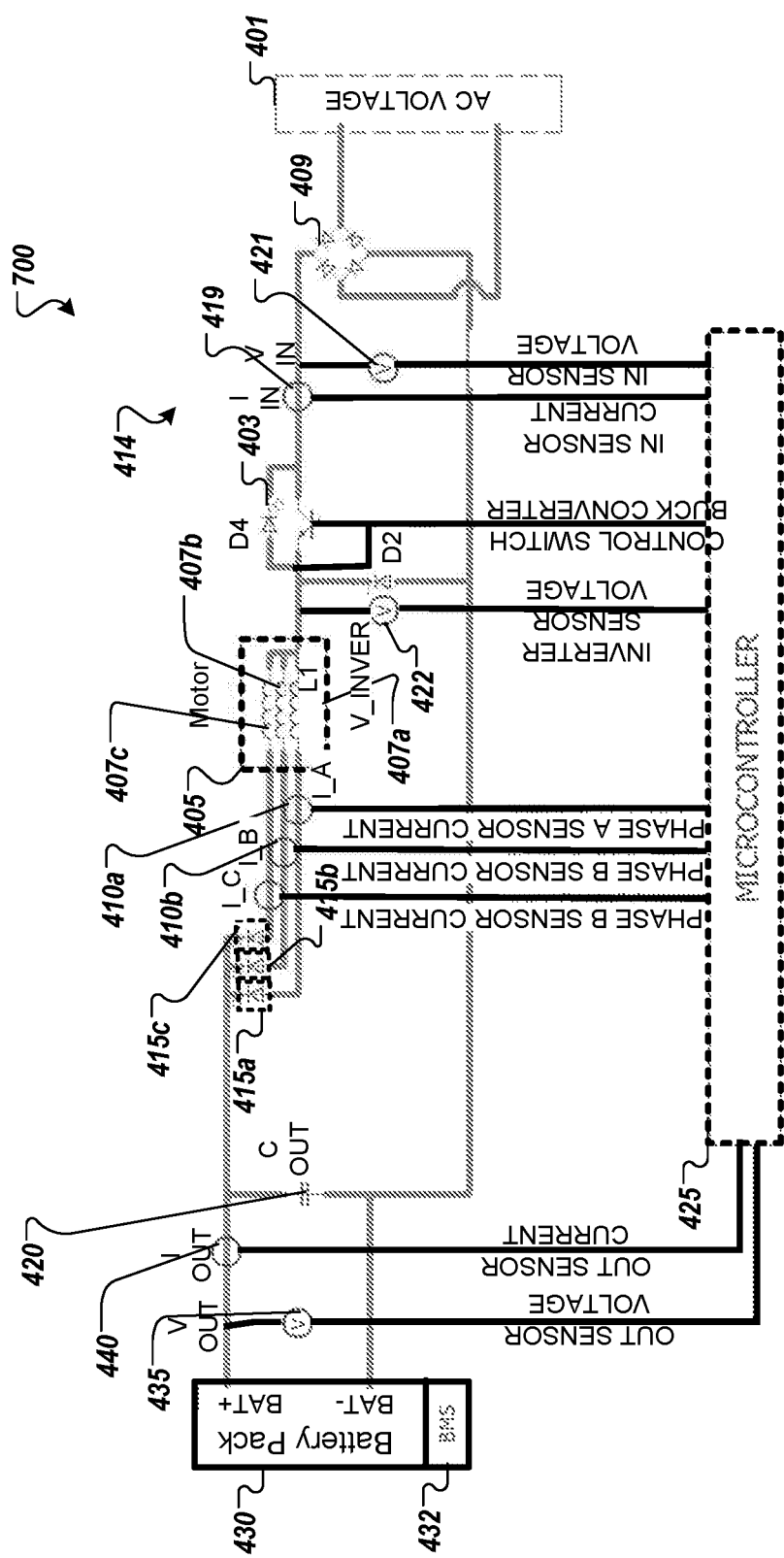

FIGS. 6 and 7 illustrate functional circuits 600, 700 used to charge the battery pack 430 in a non-driving motor driving mode. In these configurations, the functional circuits 600, 700 are connected to the power input circuit 414 illustrated in FIG. 4.

In charging mode, the motor 405 is stopped and a main AC source is connected at connector 401. When the microcontroller 425 of full EV drive train system 400 detects that the main AC source is connected and in normal operational condition, a charging process may begin. This full EV drive train system 400 may include two mains charging stages: a buck topology stage illustrated in FIG. 7 and a boost topology stage FIG. 6. If the battery voltage is higher than the rectified peak voltage of the AC source (typical case), then the controller 425 implements a current controlled boost converter by switching the lower portion of one of the transistor module 415*a*. Only using one leg of each transistor modules 415*a*-415*c* is sufficient enough to fully complete the charging cycle. In some example implementations, the microcontroller 425 of the full EV drive train system 400 may be configured use a different leg of each transistor modules 415*a*-415*c*, each time a charging mode is activated to extend the lifetime for the components that are part of the transistor modules 415*a*-415*c*.

This configuration may eliminate the need for an input capacitor connected to the AC source in the charging circuit. In some example implementations, this configuration may also allow implementation of an improved Power Factor Correction (PFC) algorithm used in the charger. For example, the Battery Management System (BMS) 432 may monitor individually each cell (or group of parallel cells) serially connected in the battery pack 430 (also referred to as an energy pack) and implement a balancing protocol when the voltage of a particular cell (or group of parallel cells) reaches a pre-established limit. When all cells reach the max pre-established charging voltage, depending on a user selected configuration, the microcontroller 425 may implements a voltage control loop until current is minimal and thus, charge is finished.

FIG. 6 illustrates a simplified circuit diagram 600 of an implemented PFC boost converter in accordance with an example implementation of the present application. As illustrated, there are three circles 601-603 highlighting components of the boost converter circuit. In circle number 601, the buck switch 403 is illustrated. The buck switch 403 may be configured for power factor correction during charging mode when a battery voltage value is higher than an input peak voltage value. In circle number 602, the upper switch 604 of the transistor module 415*a* is illustrated. In the boost converter configuration, the upper switch 604 will be completely off (e.g., the transistor module 415*a*'s parallel schottky diode will act as the free run diode of the boost circuit). Finally, the insulated-gate bipolar transistor (IGBT) 605 of the transistor module 415*a* in circle 603 will be the main switch of the boost configuration of the full EV drive train system 400. In some example implementations, a Power Factor Corrector algorithm may in used by the microcontroller 425 to achieve improved efficiency (e.g., allow smaller components to be used) and the requirement of an input filter capacitor to be avoided.

FIG. 7 illustrates a simplified circuit diagram 700 of an implemented buck charging configuration in accordance with an example implementation of the present application. If the battery voltage of the battery pack 430 is lower than the rectified input voltage from the connector 401, then the buck charging switch 403 is driven with pulse width modulation (PWM) signals and the three transistor modules 415*a*-415*c* are maintained off (e.g., only the parallel Schottky diodes of the transistor modules 415*a*-415*c* are shown, because the lower transistors are off and have no effect on the simplified equivalent circuit). In this configuration a Power Factor Corrector algorithm is also implemented by the microcontroller 425 to allow an improved efficiency and avoid any requirement of an input capacitor. The microcontroller 425 may control the incoming current until the voltage in the battery is equal to the input. Then, the Buck charge switch is kept on PFC state and the above charging phase begins (boost converter phase).

Additional Functionality: Energy Injection to a Power Grid

Figure 8:
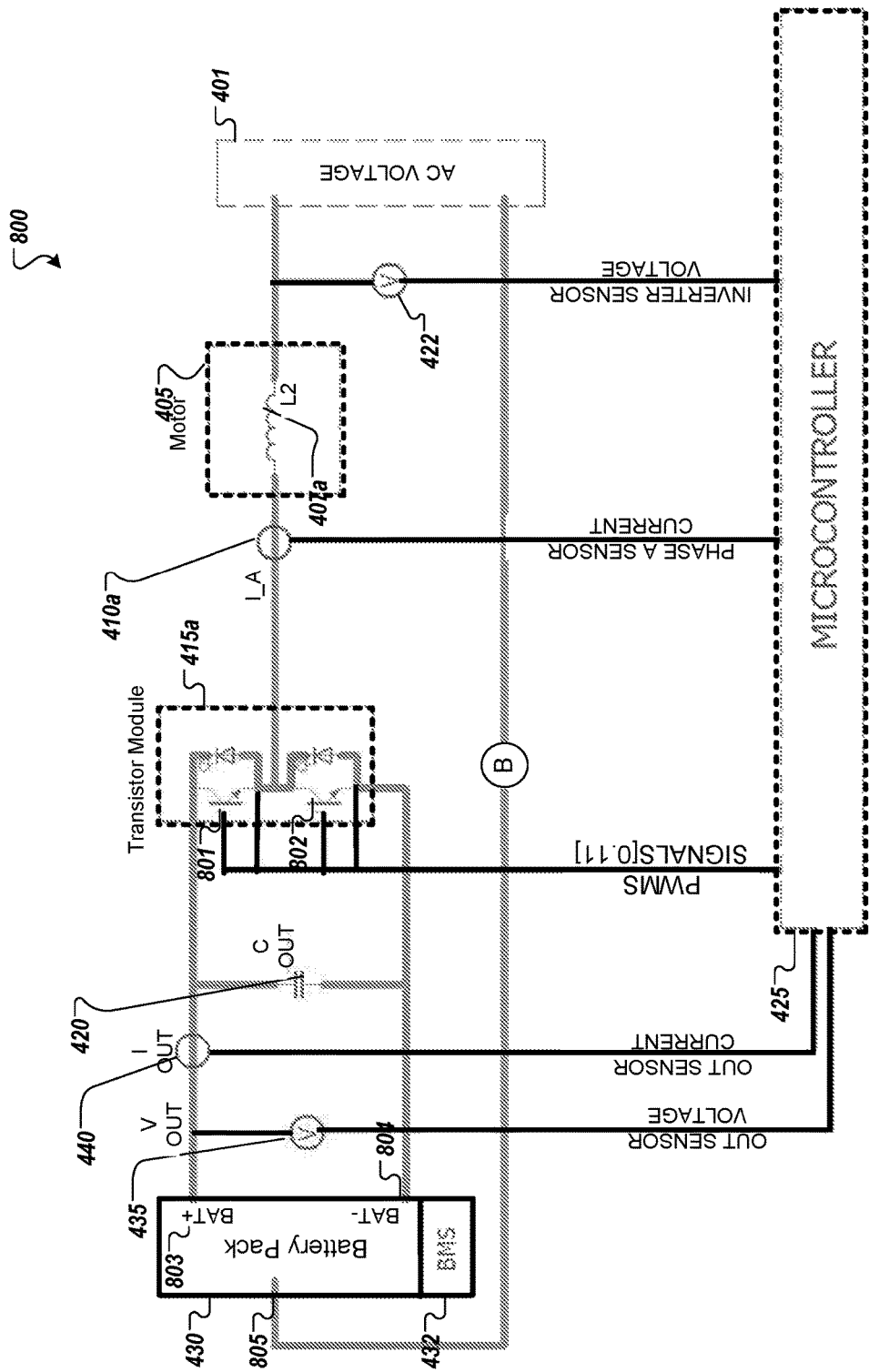
Figure 9:
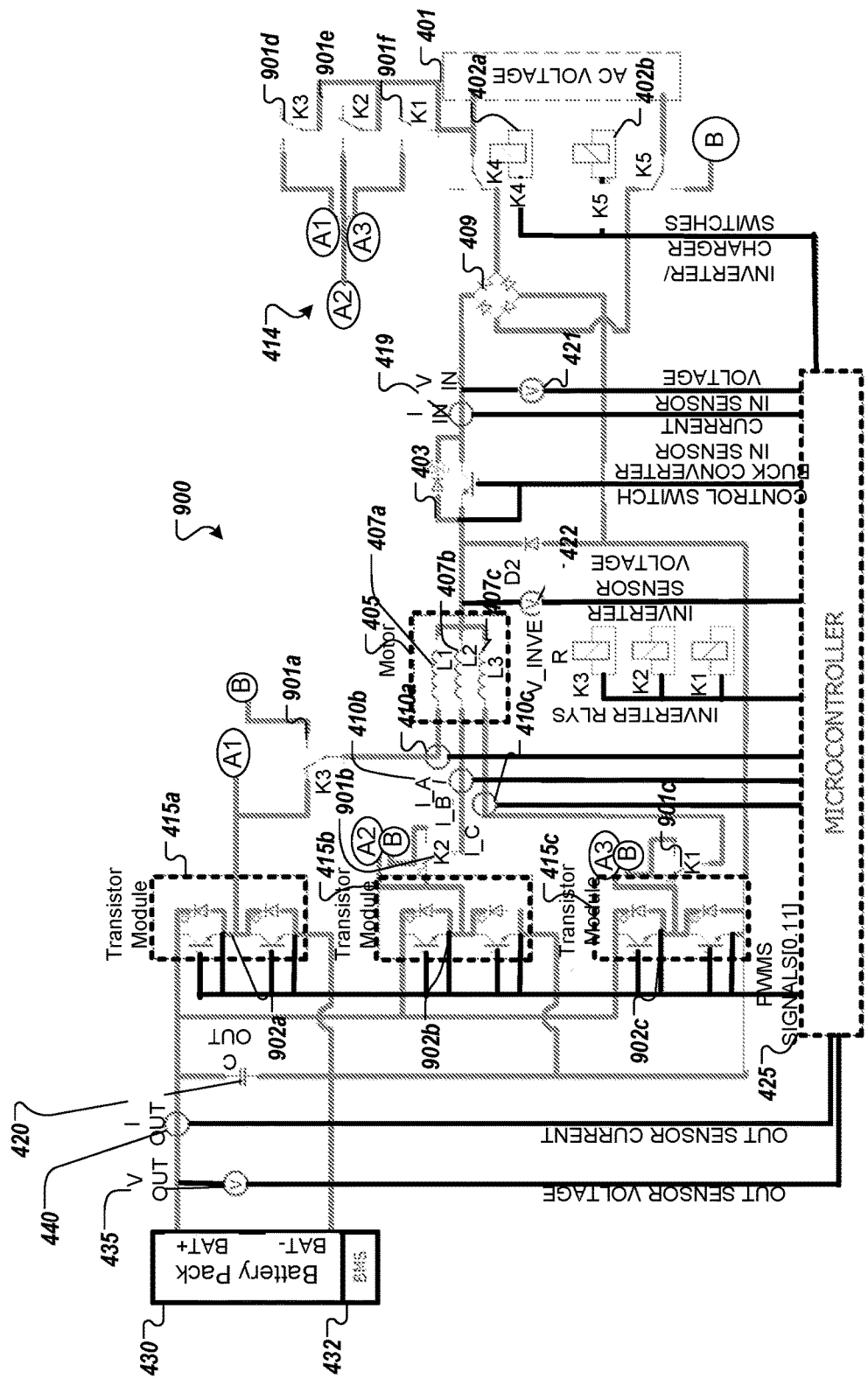
Figure 10:
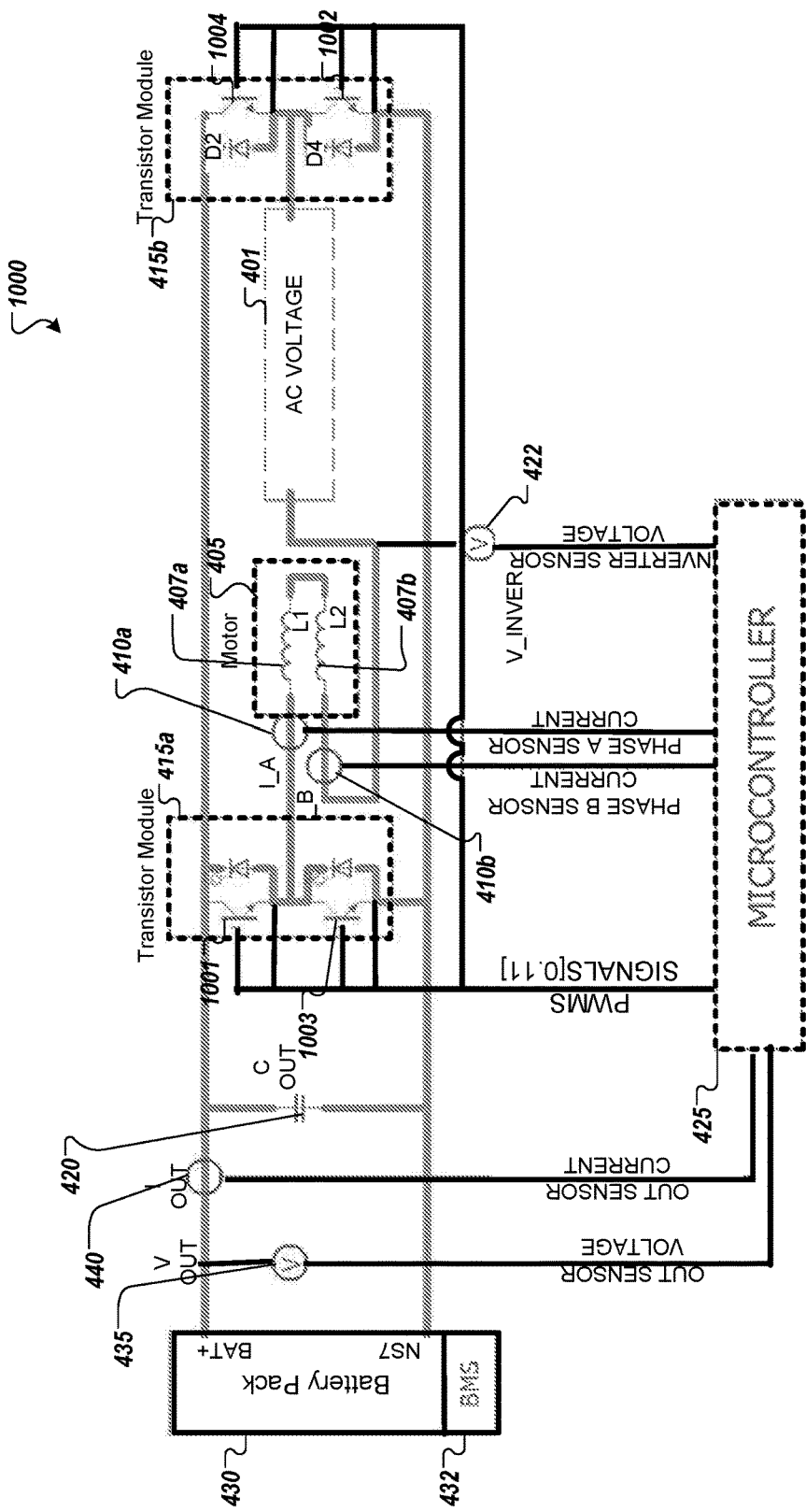

In addition to driving mode and charging modes, an example implementation of the the full EV drive train system 400 may also include one or more modes for storing electricity and injecting the energy into a power grid. FIGS. 8-10 illustrate simplified circuits for example implementations of storing electricity and injecting energy into the power grid.

As illustrated in the simplified circuit 800 of FIG. 8, one example implementations may involve the use of one of the legs of each transistor modules 415a-415c as an inverter, and the switch of the dedicated relays 402a, 402b of FIG. 4. For example, with reference to FIG. 4, the switch of relay 402b may be configured to connect along connection (B) to a midpoint in the battery pack 430 and converting the AC input connector 401 into an AC output connector 401 as well as disconnect the connector's pins from the rectifier diode bridge 409 and connecting them to the midpoint of the battery pack 430 and to the output of the inverter (right side pin of motor inductor 407a) respectively.

In some example implementations, this feature may be achieved by implementing a sinusoidal pulse width modulation (SPWM) on the insulated-gate bipolar transistor (IGBT) inputs and, thus generating a sinusoidal wave in the output of the circuit illustrated in FIG. 8

As illustrated, one of legs of the transistor module 415a is connected to the battery pack 430 in a midpoint configuration. In other words, the upper transistor 801 is connected to the positive battery pack terminal 803 (collector), and to the inductor (motor coil 407a) of the motor 405 (emitter), while the lower transistor 802 is connected between the inductor motor coil 407a (collector) and the ground terminal 804 of the battery pack 430 (emitter). With this circuit 800 and a well implemented sinusoidal pulse width modulation, a nearly pure sinusoidal wave may be obtained between the midpoint pin 805 of the battery pack 430 and right side pin of the motor coil 407a, both connected to the AC connector 401, with the maximum peak amplitude of the circuit output being half of the battery pack 430 absolute voltage. In the first half-cycle of the sine wave, the upper transistor 801 will be gated (reaching a positive voltage in the output), and in the second half-cycle of the sine wave, the lower transistor 802 will be gated (generating the negative voltage output). A three-phased AC output can be generated by gating the others two legs of transistor modules, producing respectively a 120 degrees and a 240 degrees out-of-phase sinusoidal wave.

FIG. 9 illustrates another example implementation of a circuit 900 for generating AC current reusing the hardware of the full EV drive train system 400. In FIG. 9, the full EV drive train system 400 has been modified by the addition of a switches 901a-901c between the midpoint 902a-902c of each transistor module 415a-415c and each inductor (motor coil 407a-407c) and the addition of switches 901d-901f selectively connecting the connector 401 to the midpoint 902a-902c of each transistor module 415a-415c. In some example implementations, switches 901a and 901d may be paired together to be achieve a desired operation. Further, in some example implementations, switches 901b and 901e may be paired together to be achieve a desired operation. Additionally, in some example implementations, switches 901c and 901f may be paired together to be achieve a desired operation.

In the configuration of FIG. 9, it is not necessary to add a midpoint to the battery pack 430, because an H-Bridge inverter implementation is used. Additionally, the microcontroller 425 may alternate, which of the transistor modules 415a-415c is used as a generator to increase the work life of the full EV drive train system 400.

FIG. 10 illustrates a simplified circuit diagram of the inverter of FIG. 9. As illustrated, switching only one of the three relays 901a-901c (which may each be a Dual Pole Dual Throw (DPDT) relay) shown in the FIG. 9, the simplified circuit 1000 of FIG. 10 is produced. This simplified circuit 1000 is an inverter which is capable of generating an AC current in its output through the use of a sinusoidal pulse width modulation in the transistors' gates of the transistor modules 415a, 415b. When the upper-left transistor 1001 and the lower-right transistor 1002 are being gated, and the other two transistors 1003, 1004 are in off state, a positive half-cycle sine wave is generated on the load, and when the upper-right transistor 1004 and the lower left transistor 1003 are being gated and the other two transistors 1001, 1002 are in off state, a negative half-cycle sine wave is generated on the load. In some example implementations, an output capacitor may be placed between the pins of the AC connector to form a low-pass filter in combination with the inductance of the motor coils 407a-407c to generate a sinusoidal wave on the output.

Battery Pack/Energy Module Configuration

FIGS. 11A-11E illustrate different views of the exterior of an example implementation of the battery pack 430 illustrated in FIGS. 4-10 above. In some example implementations, a single battery pack 430 may be used. However, in some example implementations, a plurality of battery packs 430 may be stacked to build a larger energy pack.

Figure 11F:
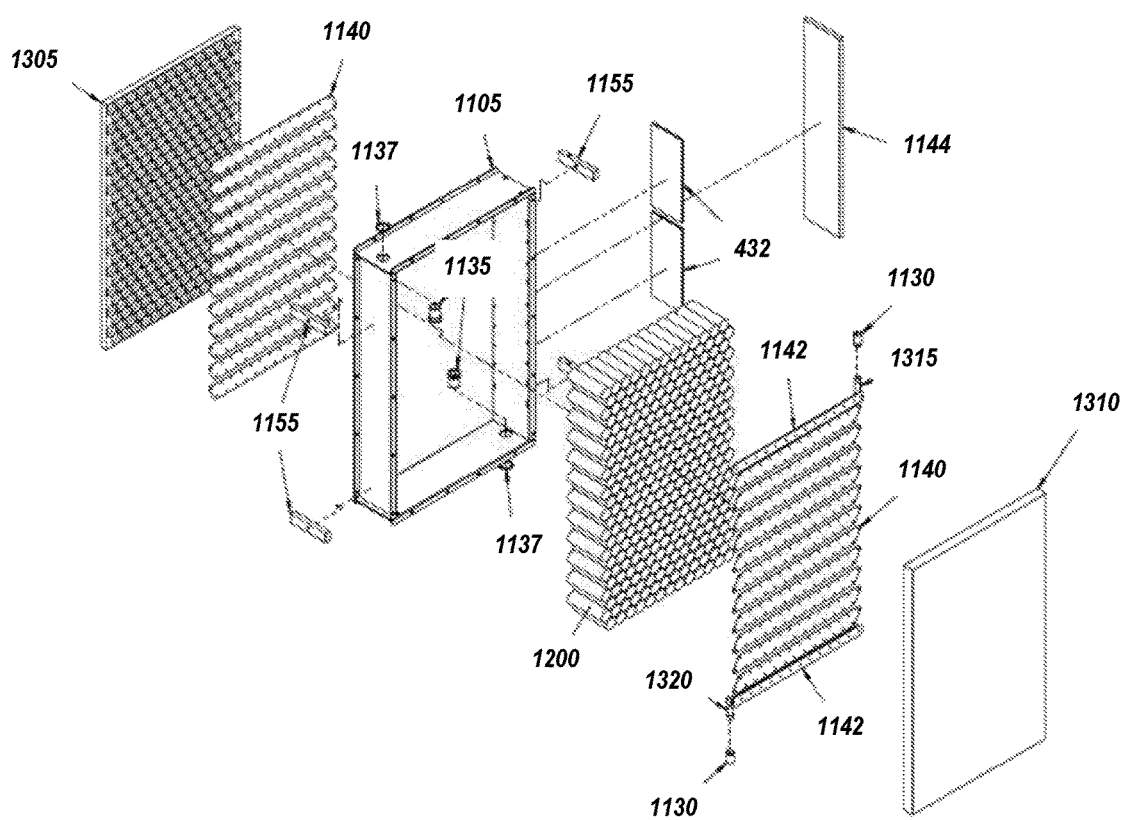
FIG. 11F illustrates an exploded view of an example implementation of the battery pack in accordance with the present application.

FIG. 11A illustrates a perspective view of an example implementation of the battery pack 430. FIG. 11B illustrates a top view of an example implementation of the battery pack 430. FIG. 11C illustrates a side view of an example implementation of the battery pack 430. FIG. 11D illustrates an end view of an example implementation of the battery pack 430. FIG. 11E illustrates a bottom view of an example implementation of the battery pack 430. FIG. 11F illustrates an exploded view of an example implementation of the battery pack 430. As illustrated, the battery pack 430 includes a battery housing 1105 formed by an upper wall 1110, a lower wall 1115, and a pair of side walls 1120. As illustrated, the ends 1125 of the battery pack 430 are illustrated as open to allow visualization of the interior of the battery housing 1105. The upper wall 1110, lower wall 1115, and a pair of side walls 1120 may be joined together by any mechanism that might be apparent to a person of ordinary skill in the art. For example, the upper wall 1110, lower wall 1115, and pair of side walls 1120 may be bolted together, screwed together, riveted together, or welded together in an example implementation of the present application.

Within the battery housing 1105, a plurality of cells 1200 may be provided along with a plurality of conductive sheets 1140 connecting terminals of the cells 1200. As discussed below a pair of resin sheets 1305, 1310 may be used as walls on the sides 1125 of the battery housing 430 to enclose the cells 1200. As discussed below, the battery pack 430 may be an implementation of a specific battery module assembled with a plurality of individual cells located therein. Additionally, a cooling fluid may be circulated through battery pack 430 to cool individual cells. As illustrated in FIGS. 11A-11F, the upper wall 1110 and the lower wall 1115 may each have an electrical connection port 1130 to connect the battery pack 430 with other battery packs 430 or the other components of the full EV drive train system 400. The upper wall 1110 and the lower wall 1115 may also have an exchange port 1135 to allow cooling fluid to be pumped in and out of the battery pack 430.

In the exploded view of FIG. 11F, the battery housing 1105 formed by the side walls 1120, upper wall 1110 and lower wall 1115 is illustrated. The exchange port 1135 passes through the battery housing 1105 to provide fluid communication there through. In some example implementations, a sealing ring 1137 may be provided around each fluid port to prevent leaking. In some example implementations, support blocks 1155 and BMS boards 432 covered by a resin sheet 1144 may be provided on any of the side walls 1120.

Within the battery housing 1105, a plurality of cylindrical cells 1200 are arranged with a plurality of conductive sheets 1140 located at both ends. The conductive sheets 1140 may provide electrical interconnection between terminals of each of the individual cells 1200. The metal sheets may be formed from any conductive metal that might be apparent to a person of ordinary skill in the art including, for example, copper, gold, silver, or any other electrical contact material that might be apparent to a person of ordinary skill in the art. The structure of the individual cells 1200 is discussed in greater detail below.

Resin sheets 1305, 1310 may be provided outside of the conductive sheets 1140 to provide structural support and electrical insulation to the ends of the cells 1200. Additionally, conductive terminal blocks 1142 may be provided at the upper and lower ends of conductive sheets 1140 to connect to upper and lower terminals 1315, 1320 inserted in to the electrical ports 1130 to allow electrical connection to other battery packs 430 or to the electrical system 400 discussed above. Additional, a series of battery management system (BMS) boards 432 may be provided at one of the side walls 1120 to control the State Of Charge (SOC) of the batteries and thus helping to guarantee a longer lifetime. The BMS boards 432 may also be covered by resin sheets 1144 to provide support and electrical isolation.

FIG. 12 illustrates a several example implementations of individual cells 1200. In some example implementations, each individual cell 1200 may conform to power cell industry standard 18650, which can be prefabricated in large numbers. This may allow cost reductions, manufacturer independency, cell chemistry independency, continuous provision, continuous improvement of cell chemistry, and different application by changing the cells model depending on the desired performance requirements by choosing from the different options available on the market.

As illustrated, each individual cell 1200 may have a generally cylindrical structure with a terminal 1205 located at each end. Additionally, a non-conductive coating 1210 formed from plastic, ceramic or other non-conductive material may be applied to the sides of each cell.

Figure 13E:
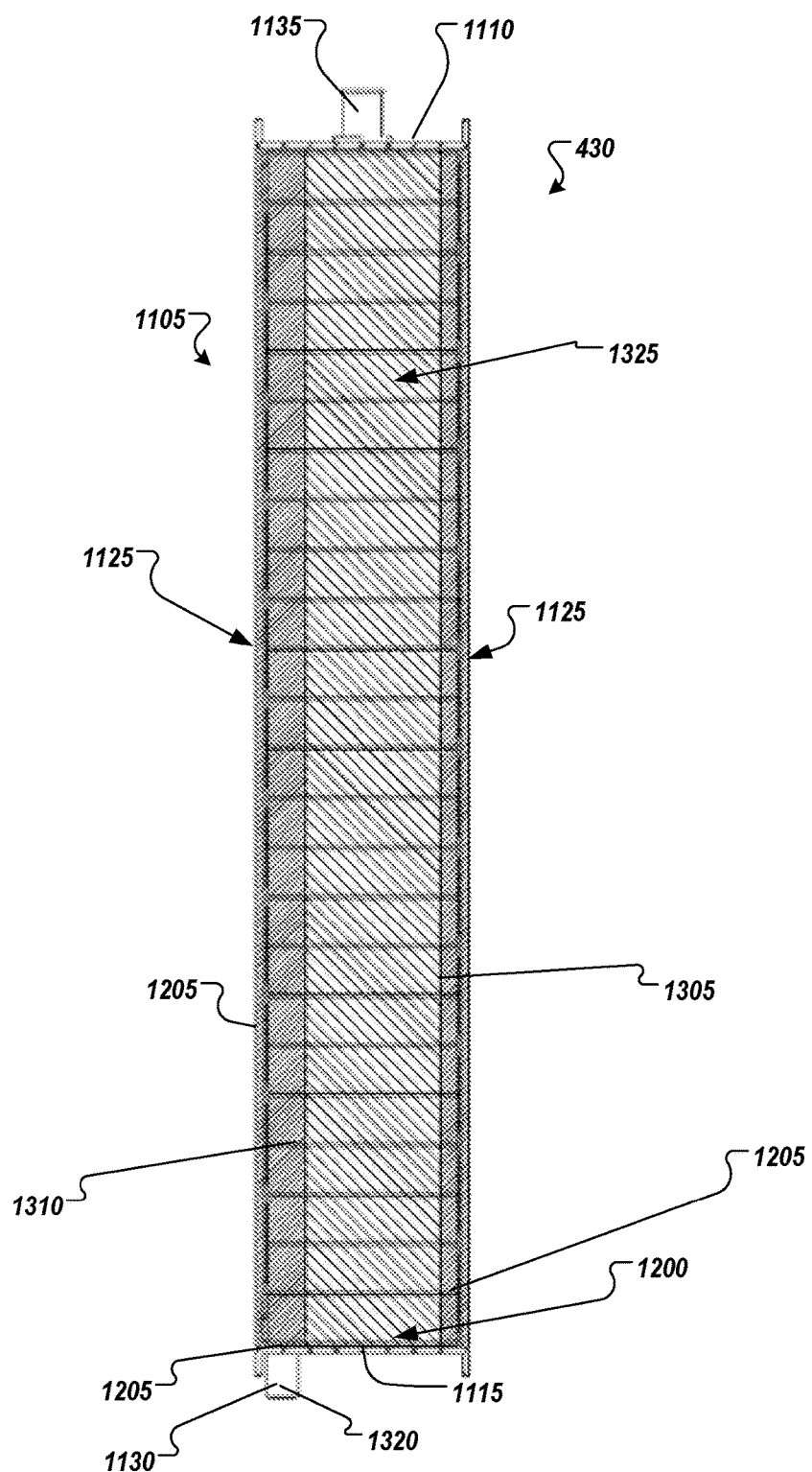

FIGS. 13A-13E illustrates an example implementation of a configuration of the cells within the battery pack 430. FIG. 13A illustrates a perspective view of the example implementation of the cells within the battery pack 430. FIG. 13B illustrates a front view of the example implementation of the cells within the battery pack 430. FIG. 13C illustrates a side view of the example implementation of the cells within the battery pack 430. FIG. 13D illustrates an end view of the example implementation of the cells within the battery pack 430. FIG. 13E illustrates a cross section of the battery pack 430 along line XIII-XIII' showing the configuration of the individuals cells 1200 within the housing 1105. Within the battery pack 430, the cell configuration is not particularly limited and different specific types may be selected to provide different levels of current and thus different levels of power based on the needed application.

As illustrated in FIGS. 13A-13E, the cells 1200 may be in a tightly packed configuration of rows and columns with an upper terminal 1315 and a lower terminal 1320 being provided to allow connection to other battery packs 430 or to the other components of the full EV drive train system 400 discussed above. The upper terminal 1315 and lower terminal 1320 may be located within the electrical connection ports 1130 discussed above. The cells 1200 in each row may be arranged to have all of the same terminals oriented in the same direction (e.g., bottom row of FIG. 13B have positive (+) terminals oriented forward). Further, the cells 1200 in vertically adjacent rows may be arranged to have terminals in opposing directions (e.g., $2^{nd}$ row from bottom of FIG. 13B have negative (−) terminals oriented forward). Some of the terminals 1205 of the individual cells 1200 may be connected to the battery management system 432 to monitor voltage and current levels of the battery pack 430 to provide monitoring and control during charging and discharging operations.

Additionally, as illustrated, a pair of resin sheets 1305, 1310 have been provide at each terminal 1205 of the individual cells 1200. These resin sheets 1305, 1310 may be formed by a special resin compound used to isolate the terminals 1205 of the individual cells 1200 and the metal sheets (1140 in FIG. 11F), which provide interconnections between the individual cells 1200. The resin sheets 1305, 1310 may provide sealing and mechanical support to the cells 1200 inside battery pack housing 1105 structure. Additionally, the resin sheets 1305, 1310 may also fixate and seal an Electric Connector (EC) portion formed by the upper and lower terminals 1315, 1320 within the electrical connection ports 1130 (illustrated in FIGS. 11A-11F) of the battery pack 430 discussed above. The material of the resin is not particularly limited and may include any resin that may be water resistant and capable of withstanding a temperature working range of the battery pack 430 without degradation of its properties. These sheets of resin are the ones which form the walls of the internal support frame.

In some example implementations, the resin sheet 1305 may be considered a back side resin sheet encapsulating the rear side terminals 1205 of the individual cells 1200. The resin sheet 1310 may be considered a front side resin sheet encapsulating the front side terminals 1205 of the individual cells 1200, as well as the conductive sheets 1140 and the terminal blocks 1142. In some example implementations, the resin sheet may encapsulate the EC portion (e.g., the upper and lower terminals 1315, 1320 within the electrical connection ports 1130 (illustrated in FIGS. 11A-11F) of the battery pack 430).

The resin sheets 1305, 1310 may be formed using a casting method to fill the spaces of the battery pack 430 to fill the space between the individual cells 1200 where the resin is intended to be. In this method, a piston may be used to push liquid resin inside the battery pack 430 to distribute the resin into cells terminals 1205, electric terminals 1315, 1320 and conductive sheets 1140 used to electrically interconnect the individual cells 1200.

In some example implementations, a gap 1325 may be formed between the resin sheet 1305 and the resin sheet 1310. As illustrated, the exchange port 1135 is oriented to align with the gap 1325 to allow cooling fluid to be pumped in and out of gap to submerge the exteriors of the individual cells 1200 to cool the individual cells during operation of the battery pack 430 as discussed in greater detail below.

FIGS. 14A-14D illustrate a cooling configuration of the individual cells 430 of a battery pack 430 according to an example implementation of the present application. FIGS. 14A and 14B illustrate front and rear perspective views of the cooling configuration. FIG. 14C illustrates the cross-section illustrated in FIG. 13E. FIG. 14D illustrates a schematic view of fluid flow through the interior of the battery back 430.

As discussed above, the resin sheets 1305, 1310 may provide sealing and mechanical support to the cells 1200 inside battery pack housing 1105 structure by encapsulating the terminals 1205 of the individual cells 1200 as well as the EC portion (e.g., the upper and lower terminals 1315, 1320 within the electrical connection ports 1130. Additionally, a gap 1325 may be formed between the resin sheet 1305 and the resin sheet 1310. The exchange port 1135 is oriented to align with the gap 1325 to allow cooling fluid to be pumped in and out of gap 1325 to submerge the exteriors of the individual cells 1200 to cool the individual cells during operation of the battery pack 430 as discussed in greater detail below.

As illustrated in FIG. 14C, cooling fluid 1405 may be pumped into the gap 1325 between the sheets 1305, 1310 to fill any spaces between the individual cells 1200. In this configuration, the cells 1200 may be surrounded by a non-conductive refrigeration fluid (e.g., cooling fluid 1405) isolated by the non-conductive coating 1210 that covers the sides of the cells 1200. The terminals 1205 at the ends of the cells 1200 may be isolated by the resin where they are encapsulated.

The cooling fluid 1405 may be selected to be a material having a high specific heat to allow a high heat capacity in a small volume and absorb the heat generated by the cells, both through charging and discharging and from the surrounding environment, helping to maintain steady temperature within the battery pack 430. In some example implementations, the cooling fluid 1405 may be glycol, ultra-purified-water solution, non-conductive oil, or combinations thereof, or any other cooling fluid that might be apparent to a person of ordinary skill in the art.

In some example implementations, the cooling fluid may be circulated through the battery pack 430. For example, as illustrated in FIG. 14D, fluid 1405 may be injected into the battery pack 430 through the exchange port 1135 on the upper surface of the battery pack and withdrawn through the exchange port 1135 located on the bottom surface of the battery pack. Within the battery pack, no routing or fluid guide structure between the cells 1200 are provided. The fluid 1405 may be allowed to flow freely between the cells 1200 and driven through the battery by positive fluid pressure of the fluid 1405 at the exchange port 1135 at the upper surface of the battery pack 430, negative fluid pressure of the fluid 1405 at the exchange port 1135 at the lower surface of the battery pack 430 and gravity as illustrated by flow arrows 1410. Outside of the battery pack 430, the fluid 1405 may be cooled by a cooling device such as a radiator with forced air, water, or oiled based cooling as discussed below. Further, in some example implementations, discussed in greater detail below a plurality of battery packs 430 may be connected together such that the fluid 1405 may be pumped out of one battery pack 430 and into another battery pack 430 in series or fluid 1405 may be pumped through multiple battery packs in parallel.

Figure 15:
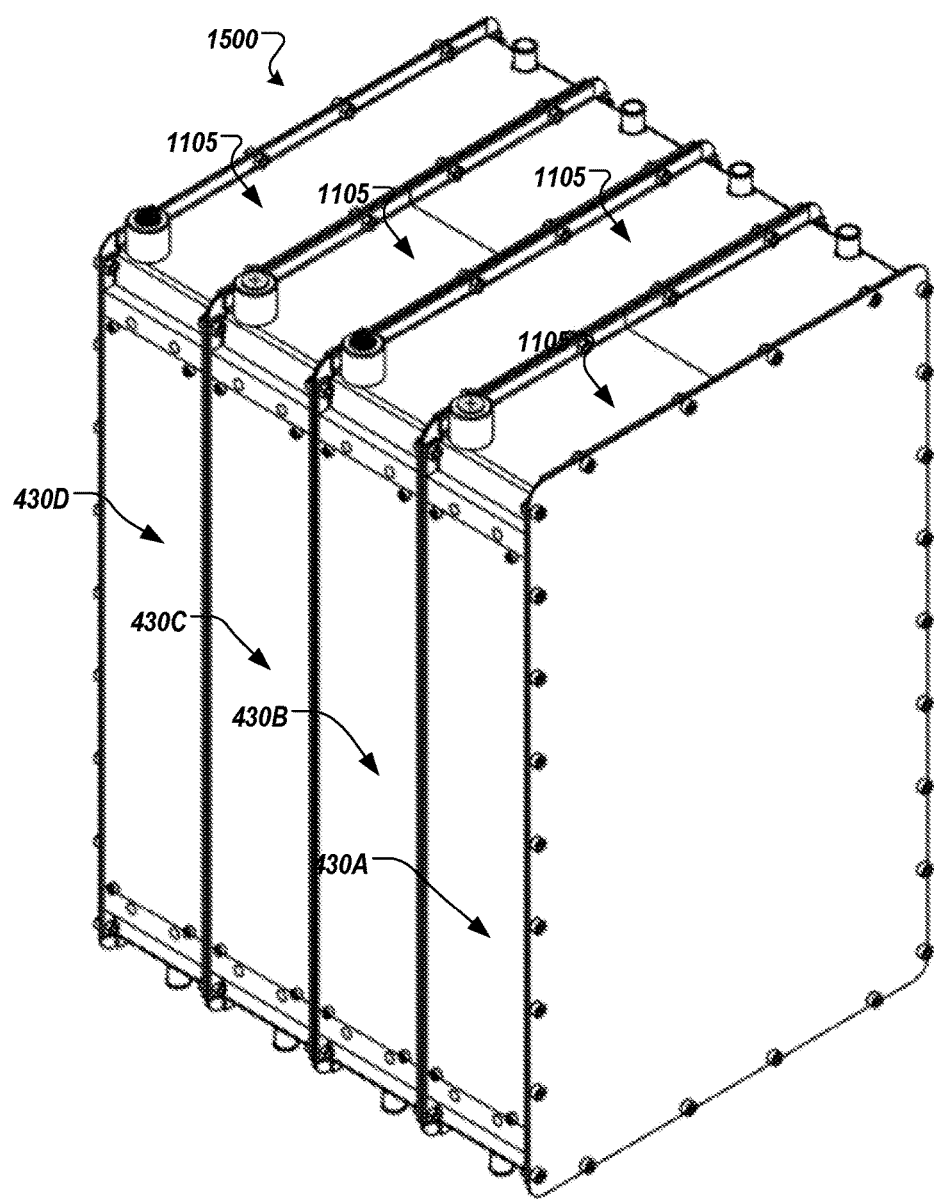
FIG. 15 illustrates an example implementation of an energy module formed a plurality of battery packs in accordance with an example implementation of the present application.

In some example implementations, a plurality of battery packs 430 may be connected together to form an energy pack or power module. FIG. 15 illustrates an example implementation of an energy module 1500 formed from four battery packs 430A-430D. As illustrated, the rectangular housing 1105 of each battery pack 430A-430D may be stacked together and interconnected by bridge connection power lines with an electric connectors. The electrical connector is not particularly limited and may be any type of connector that might be apparent to a person of ordinary skill in the art. Additionally, a joint BMS may be shared across all battery packs 430A-430D. The chemistry and properties of the cells and the internal configuration of them can be adjusted for each application in order to achieve the desire total voltage, energy and power of the energy pack 1500.

FIGS. 16A and 16B illustrate perspective views of the energy module 1500 with an integrated cooling system 1600. As discussed above, the energy module 1500 includes a plurality of battery packs 430A-430D connected together as an integrated power block. Bridge connection power lines 1610A-1610C are provided to electrically connect adjacent battery packs 430A-430D. For example, bridge connection power line 1610A electrically connects the lower terminal 1320A of battery pack 430A to the lower terminal 1320B of battery pack 430B. Further, bridge connection power line 1610B electrically connects the upper terminal 1320B of battery pack 430B to the upper terminal 1320C of battery pack 430C. Additionally, bridge connection power line 1610C electrically connects the lower terminal 1320C of battery pack 430C to the lower terminal 1320D of battery pack 430D.

The integrated cooling system 1600 includes a series of plumbing interconnects 1605A-1605C that connect the fluid exchange ports 1135A-1135D of adjacent battery packs 403A-430D. For example, plumbing interconnect 1605A fluidly connects the lower exchange port 1135A of battery pack 430A to the lower exchange port 1135B of battery pack 430B. Further, plumbing interconnect 1605B fluidly connects the upper exchange port 1135B of battery pack 430B to the upper exchange port 1135C of battery pack 430C. Additionally, plumbing interconnect 1605C fluidly connects the lower exchange port 1135C of battery pack 430C to the lower exchange port 1135D of battery pack 430D.

Additionally, the integrated cooling system 1600 also includes a radiator 1615 fluidly coupled to the upper exchange port 1135A of battery pack 430A by input pipe 1620 and to the upper exchange port 1135D of the battery pack 430D by output pipe 1625. Cooling fluid flows from the radiator 1615 through input pipe 1620 into battery pack 430A through battery packs 430B-430D and back to the radiator 1615 through output pipe 1625. A pump 1630 may be provided to pump the fluid through integrated cooling system.

Battery Management System (BMS)

Figure 17B:
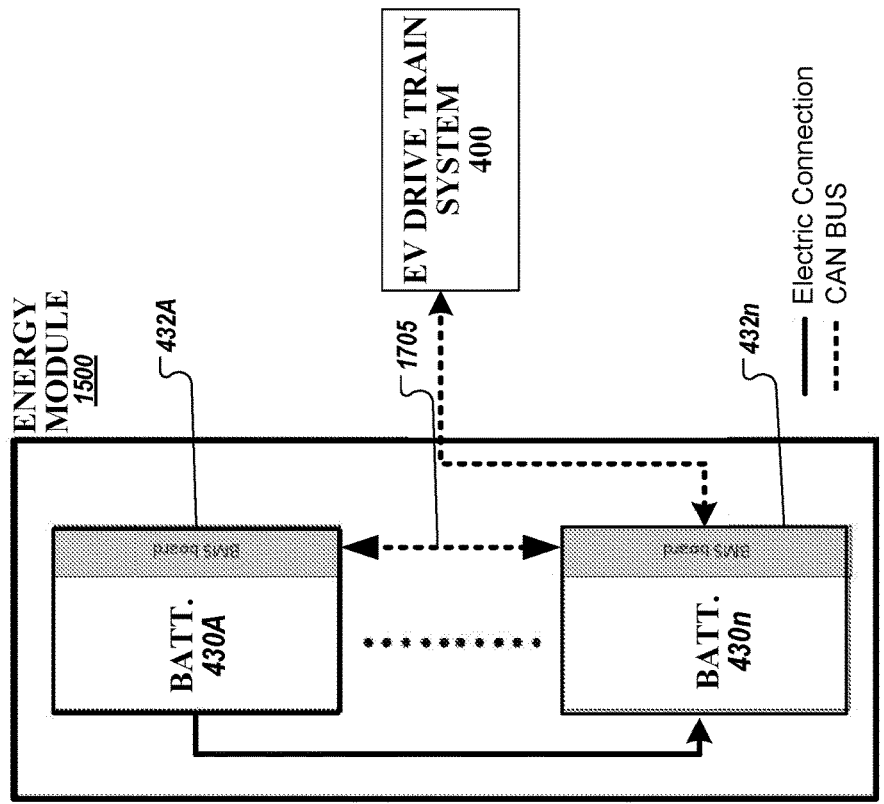
FIGS. 17A and 17B illustrate schematic representation of the operation of the Battery Management System (BMS) in accordance with example implementations of the present application.
Figure 17A:
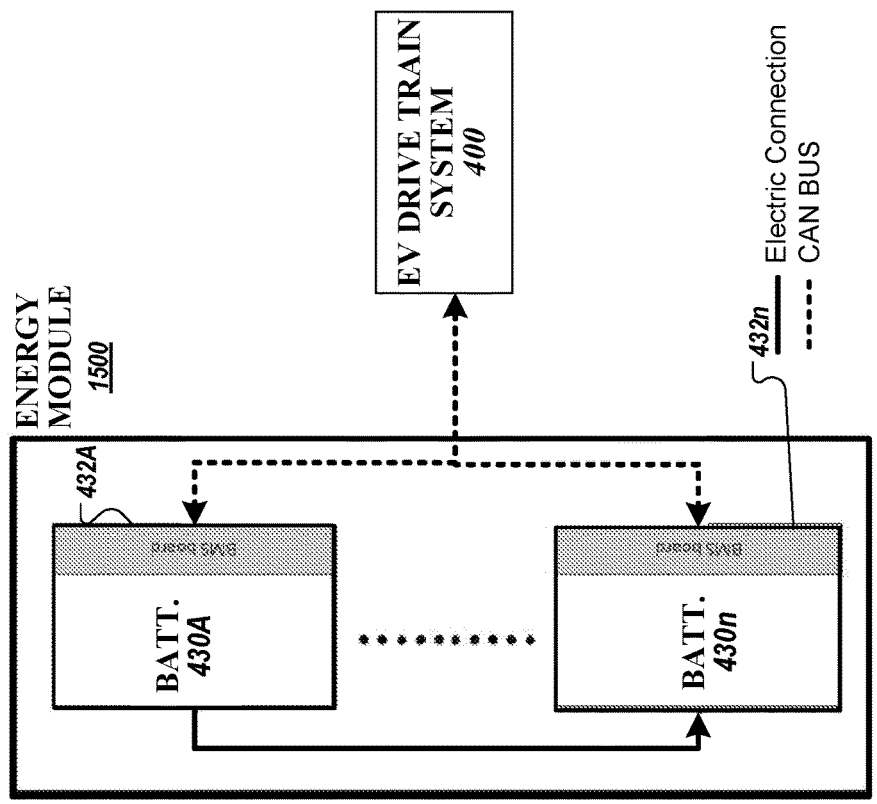

FIGS. 17A and 17B illustrate schematic representations of the operation of the Battery Management System (BMS) 432 in accordance with Example implementations of the present application. As discussed above, a BMS 432 may be integrated into each battery pack 430 may be responsible not only for voltage and State of Charge (SoC) monitoring, but also for balancing of charge of each cell 1200 within the battery pack 430 during a charging operation to maximize the autonomy of full EV drive train system 400 and cycle of life of each cell 1200. The balancing and monitoring algorithm may be performed using the microcontroller 425 or a microcontroller integrated into the BMS. Additionally, the BMS may also monitor the temperature of each battery pack 430 in several points.

The BMS 432 may support several modes and/or protocols of communication with the full EV drive train system 400. FIG. 17A illustrates an example implementation of the BMS 432 that communicates in a Master-Slave Distributed System using a Controller Area Network (CAN) communication protocol. FIG. 17B illustrates an example implementation of the BMS 432 that communicates is a Cascade Communication between all BMS boards.

In Master-Slave Distributed communication (MSDC) of FIG. 17A, each BMS 432 communicates with the full EV drive train system 400 using a Controller Area Network (CAN bus) protocol. In this configuration, each BMS 432 does not communicate with other BMS 432, but with the full EV drive train system 400.

Conversely, as illustrated in the example implementation of FIG. 17B, in the Cascade communication configuration, the communication between different BMS boards 432A-432*n* is performed in serial mode 1705 and a single BMS 432 the full EV drive train system 400.

In some example implementations, the BMS 432 may also have a hybrid mode allowing both communications between individual BMS 432 units and direct connection with the full EV drive train system 400 by multiple BMS 432 units.

Additionally, the BMS 432A-432*n* may supports bidirectional communication with the full EV drive train system 400 to allow share relevant information, such as module temperature, or State of Charge (SoC) of the battery packs 430A-430*n*.

In some example implementations, the BMS 432A-432*n* may provide an overcurrent protection in order to protect each cell 1200. The BMS 432A-432*n* may also perform the following functions:

Voltage monitoring of each cell 1200;
Balancing of each cell 1200 to the preset voltage depending on a user configuration;
State of Charge to indicate the charge level of battery 430A-430*n*;
Charge [Ah] delivered or stored (Coulomb counter) for each cell 1200;
Over voltage (during charging) and under voltage (during discharging) protection;
Average temperature of the energy module 1500; and
Over-temperature and Under-temperature protection.

In some example implementations, the cells 1200 of the battery packs 430A-430*n* may be connected to each other in parallel using a copper strip in order to form a battery string. In some example implementations a wire may be welded to the copper strip and tied to the respective BMS 432A-432*n*. The discharging resistance may be in contact with one of the sides of the energy module 1500 and isolated by a film. This may allow heat dissipation of the discharging resistance by using energy module cooling system 1600. In some example implementations, the BMS 432A-432*n* may be covered by a resin in order to protect it and isolate it from the environment.

Motor

Figure 18A:
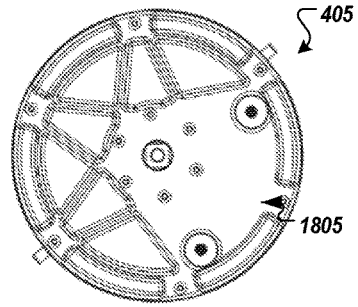
FIGS. 18A and 18B illustrate end views of a motor in accordance with an example implementation of the present application.
Figure 18C:
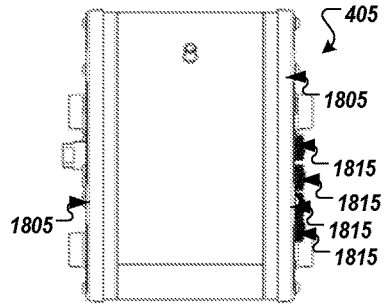
FIGS. 18C and 18D illustrate side views of the motor in accordance with an example implementation of the present application.
Figure 18B:
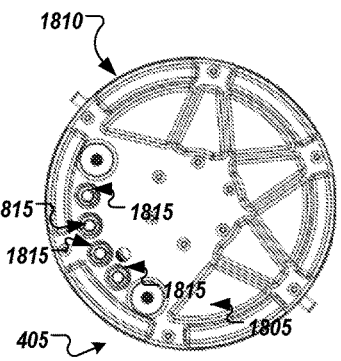
Figure 18D:
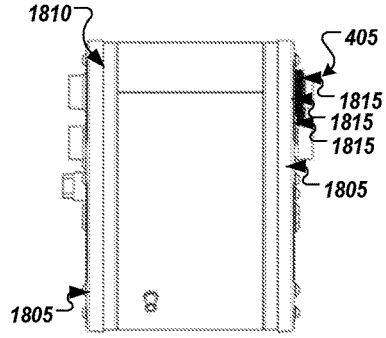
Figure 18F:
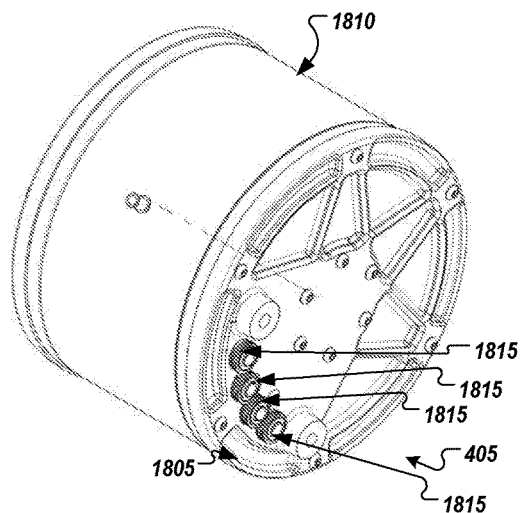
FIGS. 18E and 18F illustrate perspective views of the motor in accordance with an example implementation of the present application.
Figure 18E:
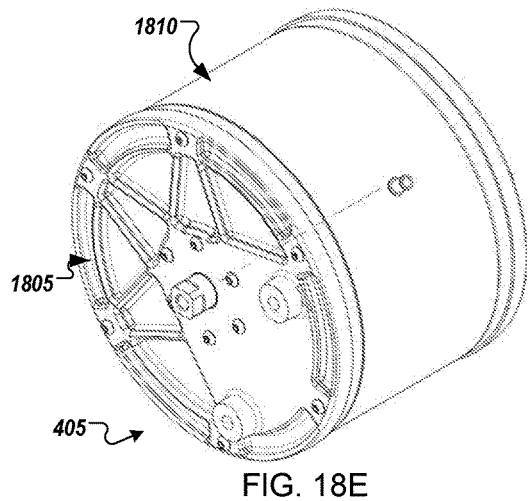
Figure 18G:
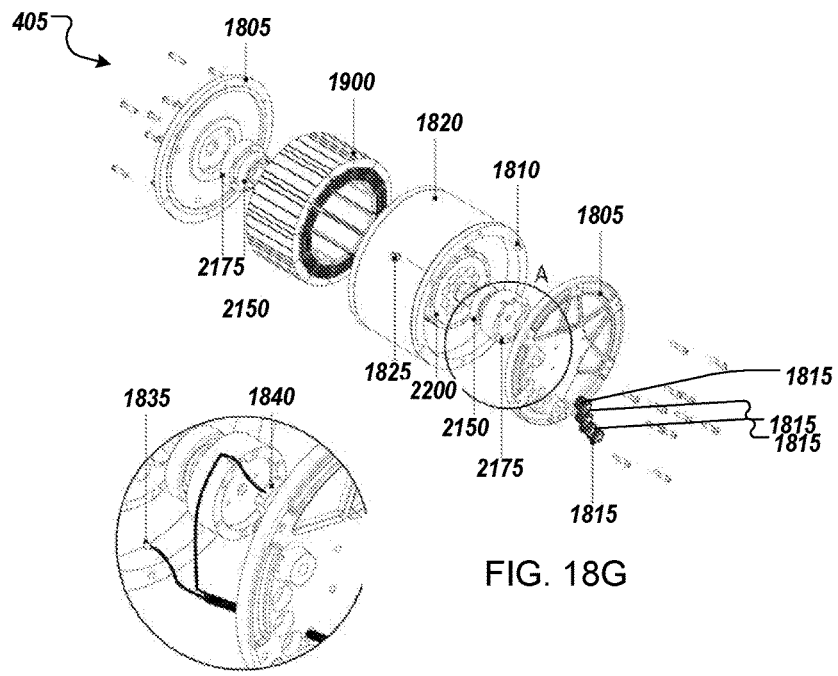
FIG. 18G illustrates an exploded view of the motor in accordance with an example implementation of the present application.
Figure 18H:
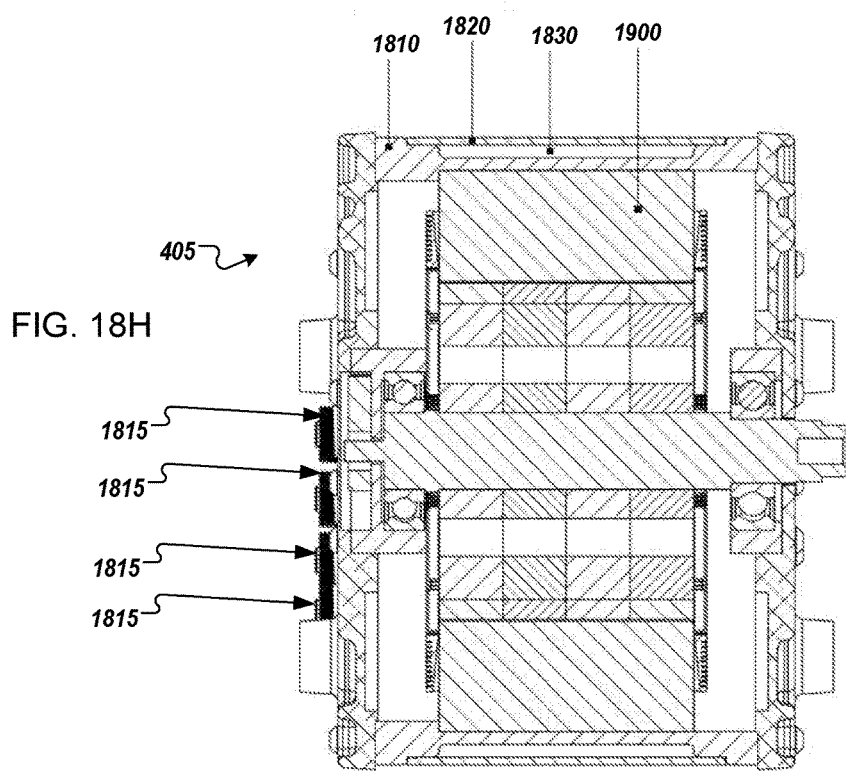
FIG. 18H illustrates a cross-section view of the motor in accordance with an example implementation of the present application.

FIGS. 18A and 18B illustrate end views of a motor 405 in accordance with an example implementation of the present application. FIGS. 18C and 18D illustrate side views of the motor 405 in accordance with an example implementation of the present application. FIGS. 18E and 18F illustrate perspective views of the motor 405 in accordance with an example implementation of the present application. FIG. 18G illustrates an exploded view of the motor 405 in accordance with an example implementation of the present application. FIG. 18H illustrates a cross-section view of the motor 405 in accordance with an example implementation of the present application. The motor 405 may be a radial Permanent Magnet Synchronous Motor (PMSM). In some example implementations, the motor 405 may include a pair of end shields 1805 (e.g., right and left covers), a motor body 1810, a stator assembly 1900, a rotor assembly 2400, a pair of bearings 2150 supporting the rotor assembly 2400 and a pair of bearing holders 2175 supporting the bearings 2150 and attaching to the end shields 1805. The motor may also include four power connectors 1815 that allow electrical connection to the three phases and the center of the star connection of the motor phases. The motor body 1810 may also include a fluid cavity 1830 through which refrigerant may be circulated via the refrigerant port 1825 and a cover 1820 that covers the fluid cavity 1830. The motor 405 may also include a temperature sensor 1835 and an encoder 1840 measuring angular rotation of the motor 405.

Stator

The stator is not particularly limited and may have any construction that might be apparent to a person of ordinary skill in the art. In some example implementations, the stator assembly 1900 may be a segmented stator. FIG. 19A illustrates a perspective view of segmented stator 1900 in accordance with an example implementation of the present application. FIG. 19B illustrates a perspective view of a stator tooth unit 1920 in accordance with an example implementation of the present application. FIG. 19C illustrates a stator tooth body 1910 in accordance with an example implementation of the present application. FIG. 19D illustrates a stator sheet 1905 that may be used to form a stator tooth body 1910 in accordance with the present application. A segmented stator assembly 1900 may allow easier and denser winding directly in the slot along with a standardized manufacturing method.

As illustrated in the perspective view of FIG. 19A, the segmented stator assembly 1900 may be formed by a plurality of stator teeth units 1920. As illustrated in FIGS. 19B and 19C, each stator tooth unit 1920 is formed by a stator tooth body 1910 with a coil of windings 1915 around a central region 1925 thereof. Each stator tooth body 1910 may be formed by stacking a plurality of stator sheets 1905 having a generally T-shipped structure.

Motor Body

A motor body may cover the stator 1900 and provides mechanical support to the teeth units 1920. FIG. 20A illustrates a top view of a motor body 1810 in accordance with an example implementation of the present application. FIG. 20B illustrates a side view of a motor body 1810 in accordance with an example implementation of the present application. FIG. 20C illustrates a bottom view of a motor body 1810 in accordance with an example implementation of the present application. FIG. 20D illustrates a cross-section view of a motor body 1810 in accordance with an example implementation of the present application. As illustrated, the motor body has a generally annular side wall 1812 with a hollow interior 1814 configured to receive the stator 1900. In some example implementations, the motor body 1810 may be made of aluminum.

Figure 20E:
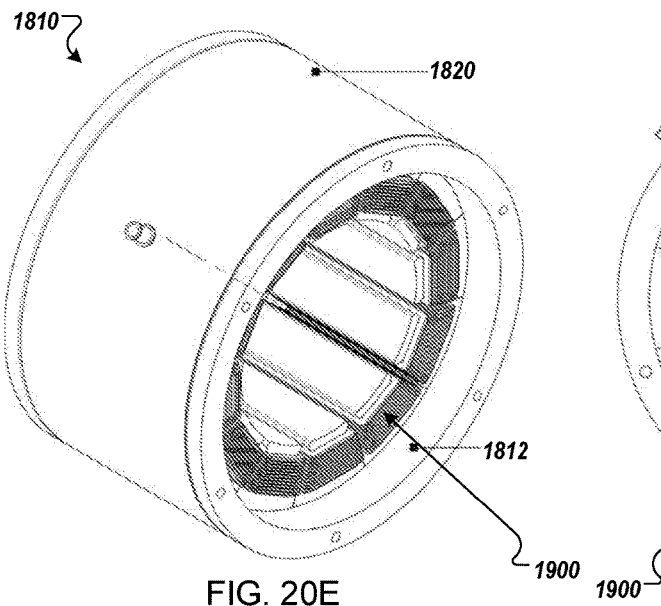
FIG. 20E is a perspective view of the motor body with the stator assembly installed in accordance with an example implementation of the present application.
Figure 20F:
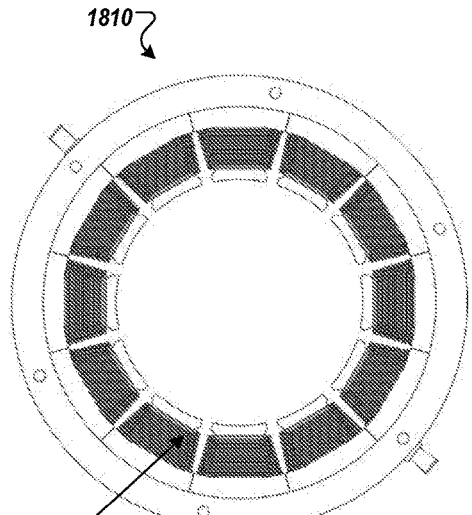
FIG. 20F is an end view of the motor body with the stator assembly installed in accordance with an example implementation of the present application.
Figure 20G:
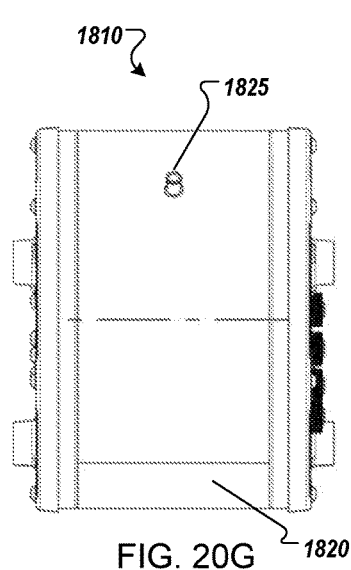
FIG. 20G is a side view of the motor body with the stator assembly installed in accordance with an example implementation of the present application.
Figure 20H:
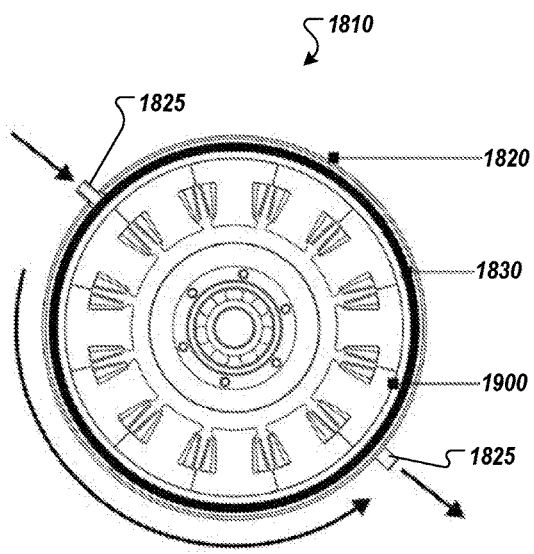
FIG. 20H is a cross-sectional view of the motor body with the stator assembly installed.

FIG. 20E is a perspective view of the motor body 1810 with the stator assembly 1900 installed. FIG. 20F is an end view of the motor body 1810 with the stator assembly 1900 installed. FIG. 20G is a side view of the motor body 1810 with the stator assembly 1900 installed. FIG. 20H is a cross-sectional view of the motor body 1810 with the stator assembly 1900 installed. In some example implementations, the motor body 1810 may have a cooling fluid cavity 1830 formed between the sidewall 1812 of the motor body 1810 and a cover 1820 surrounding the motor body 1810. Cooling fluid may be pumped into and out of the fluid cavity via a pair of refrigerant ports 1825 formed through the cover 1820.

End Shields

FIG. 21A is a perspective view of an end shield 1805 in accordance with an example implementation of the present application. FIG. 21B is a front view of an end shield 1805 in accordance with an example implementation of the present application. FIG. 21C is a back view of an end shield 1805 in accordance with an example implementation of the present application. FIG. 21D is a cross-section view of an end shield 1805 in accordance with an example implementation of the present application. In example implementations, the End Shield 1805 may be made of aluminum and may enclose the ends of the motor body 1810 and a recess 2105 to support the ball bearings 2150 where the rotor axis rotates.

Rotor

Figure 22A:
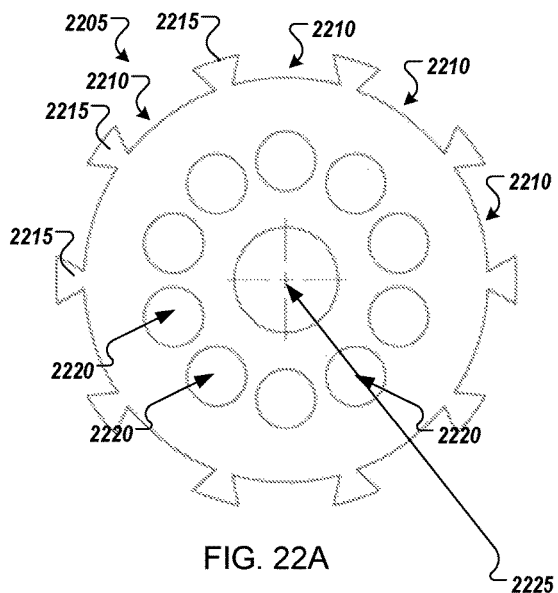
FIG. 22A is a top view of a rotor sheet in accordance with an example implementation of the present application.
Figure 22B:
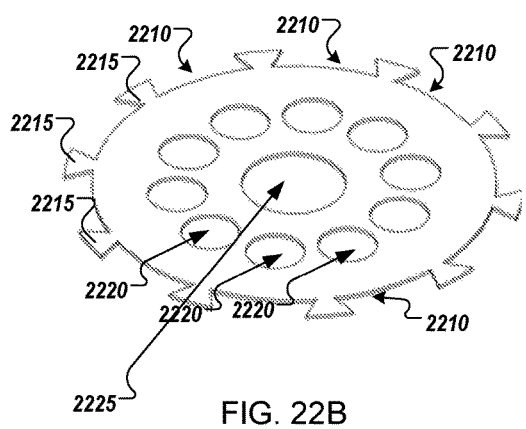
FIG. 22B is a perspective view of a rotor sheet in accordance with an example implementation of the present application.
Figure 22C:
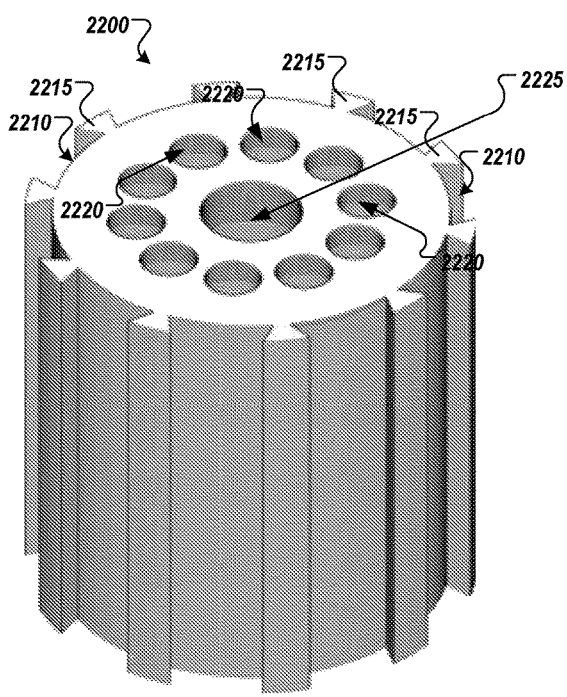
FIG. 22C is a perspective view of a rotor core formed from a plurality of rotor sheets in accordance with an example implementation of the present application.

FIG. 22A is a top view of a rotor sheet 2205 in accordance with an example implementation of the present application. FIG. 22B is a perspective view of a rotor sheet 2205 in accordance with an example implementation of the present application. FIG. 22C is a perspective view of a rotor core 2200 formed from a plurality of rotor sheets 2205 in accordance with an example implementation of the present application. In some example implementations, the rotor sheets 2205 may be steel sheets having a plurality of tabs 2215 forming magnet receiving gaps 2210 formed there between. Additionally, the rotor sheets 2205 may have a plurality of transverse holes 2220 formed there through. The rotor sheets 2205 may also have an axial hole 2225 into which an axis may be inserted. In some example implementations, each rotor sheet 2205 may be formed with a specific shape selected to maximize magnetic efficiency for the specific requirement and to allow proper mechanical attachment to a drive train. The rotor core 2200 may be a steel core formed by stacking the sheets.

Figure 23A:
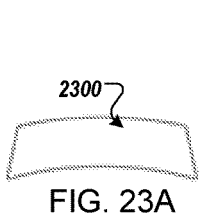
FIG. 23A illustrates a top view of a magnet for a rotor in accordance with an example implementation of the present application.
Figure 23B:
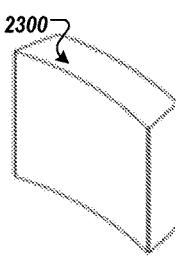
FIG. 23B illustrates perspective view of a magnet for a rotor in accordance with an example implementation of the present application.

FIG. 23A illustrates a top view of a magnet 2300 for insertion into the rotor core 2200 to form the rotor assembly 2400 in accordance with an example implementation of the present application. FIG. 23B illustrates perspective view of a magnet 2300 for insertion into the rotor core 2200 to form the rotor assembly 2400 in accordance with an example implementation of the present application. The magnets 2300 may be sized and shaped to have a specific size and shape that allows optimal performance with robust mechanical attachment to the rotor core 2200. In some example implementations, the magnets 2300 may be sized to form a tight press-fit engagement with the magnet receiving gaps 2210 of the rotor sheets 2210.

Figure 24A:
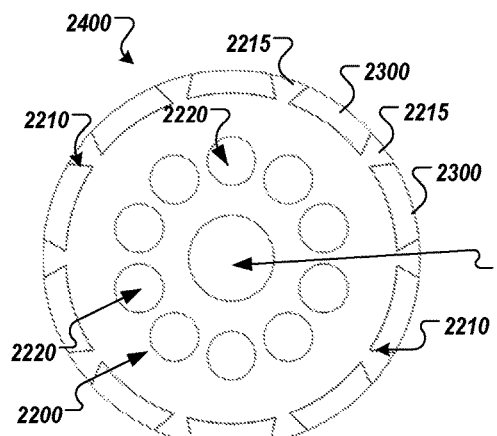
FIG. 24A illustrates a top view of an assembled rotor in accordance with an example implementation of the present application.
Figure 24D:
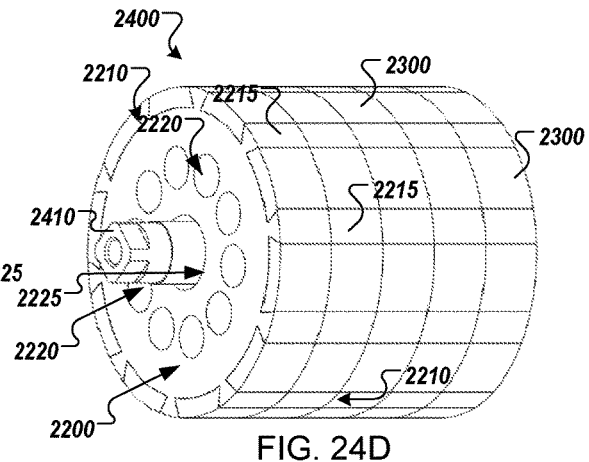
FIG. 24D illustrates a perspective view of the assembled rotor with the axle installed in accordance with an example implementation of the present application.
Figure 24B:
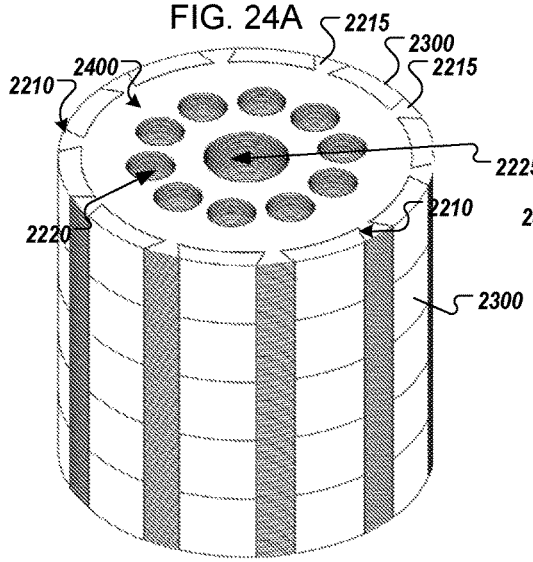
FIG. 24B illustrates a perspective view of the assembled rotor in accordance with an example implementation of the present application.
Figure 24C:
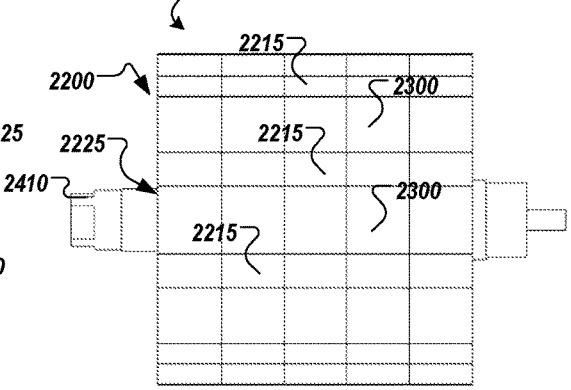
FIG. 24C illustrates a top view of an assembled rotor with an axle installed in accordance with an example implementation of the present application.

FIG. 24A illustrates a top view of an assembled rotor 2400 with the magnets 2300 installed in the rotor core 2200 in accordance with an example implementation of the present application. FIG. 24B illustrates a perspective view of the assembled rotor 2400 with the magnets 2300 installed in the rotor core 2200 in accordance with an example implementation of the present application. FIG. 24C illustrates a top view of an assembled rotor 2400 with an axle 2410 installed in accordance with an example implementation of the present application. FIG. 24D illustrates a perspective view of the assembled rotor 2400 with the axle 2410 installed. As illustrated, the magnets 2300 have been inserted into the gaps 2210 of the rotor core 2200.

Sensors

In some example implementations, the motor 405 may be equipped with angle position sensors (e.g., the encoder 1840) to know exactly where the rotor 2400 is related to the stator 1900 and provide the exact phases power signals needed. Also, a temperature sensor 1835 may be provided to ensure motor protection and implement temp control if needed.

Infotainment Systems

In some example implementations, the electric vehicle may also include an infotainment system providing connectivity and digital interaction capability. For example, the electric vehicle may be equipped with a 7" touch screen device that allows configuration of a dashboard, change vehicle settings of vehicle, use the embedded GPS, listen to music through Bluetooth or Wi-Fi connectivity, download recorded track data to a computer or publish on social media, record video or capture moments of a track while riding with the front and rear camera and any other implementations that might be apparent to a person of ordinary skill in the art.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. An energy storage device for an electric vehicle comprising:
   a housing defining an interior volume;
   a plurality power cells, arranged in the interior volume of the housing, each power cell having a first terminal at one end and a second terminal at another end, wherein each of the plurality of power cells extending in a substantially parallel configuration with intervening spaces being provided between adjacent power cells;
   a resin sheet encapsulating at least one of the first terminal at the one end and the second terminal at the another end of each of the plurality of power cells and holding the plurality of power cells in a rigid configuration; and
   a heat absorbing fluid within the housing, circulating through the intervening spaces contacting an exterior of at least one of the plurality of power cells,
   the resin sheet being positioned to isolate the heat absorbing fluid from the at least one of the first terminal at the one end and the second terminal at the another end of each of the plurality of power cells and retain the heat absorbing fluid in contact with the exterior of the at least one of the plurality of power cells.

2. The energy storage device of claim 1, wherein each of the plurality of power cells has a generally cylindrical shape with the first terminal being located at one end of the cylindrical shape, and the second terminal being located at another end of the cylindrical shape; and
   wherein the plurality of power cells are arranged in matrix having a plurality of rows and columns.

3. The energy storage device of claim 2, wherein at least one cell of the plurality of cells in a first row is oriented with a first terminal extending in a direction opposite a direction of a first terminal of at least one cell of the plurality of cells in a second row adjacent the first row.

4. The energy storage device of claim 1, wherein the resin sheet comprises:
   a first resin sheet encapsulating a first end of each of the plurality of cells; and
   a second resin sheet encapsulating a second, opposite end of each of the plurality cells,
   wherein a fluid circulation space is defined in a longitudinal area between the first resin sheet and second resin sheet.

5. The energy storage device of claim 4, wherein at least one of the first resin sheet and the second resin sheet comprises a electrical contact connecting a terminal of at least one cell of the plurality of cells to a terminal of at least one other cell of the plurality of cells.

6. The energy storage device of claim 1, further comprising an integrated battery management system having a microcontroller monitoring at least one state of at least one cell.

\* \* \* \* \*